US 8,532,702 B2

(12) United States Patent
Yoshikawa

(10) Patent No.: US 8,532,702 B2
(45) Date of Patent: Sep. 10, 2013

(54) MOBILE ELECTRONIC DEVICE WITH SOUND OUTPUT FUNCTION

(75) Inventor: Jouji Yoshikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/380,330

(22) PCT Filed: Jun. 25, 2010

(86) PCT No.: PCT/JP2010/060899
§ 371 (c)(1),
(2), (4) Date: Dec. 22, 2011

(87) PCT Pub. No.: WO2010/150891
PCT Pub. Date: Dec. 29, 2010

(65) Prior Publication Data
US 2012/0094714 A1    Apr. 19, 2012

(30) Foreign Application Priority Data
Jun. 26, 2009    (JP) ................. 2009-152947

(51) Int. Cl.
*H04M 1/00*    (2006.01)
(52) U.S. Cl.
USPC ............ 455/556.1; 455/557; 455/3.06
(58) Field of Classification Search
USPC ............ 455/556.1, 3.06, 557, 575.1; 353/15, 353/52, 85
See application file for complete search history.

(56) References Cited

U.S. PATENT DOCUMENTS

| | | | |
|---|---|---|---|
| 2007/0030455 A1* | 2/2007 | Inoue | 353/15 |
| 2008/0094579 A1* | 4/2008 | Fujinawa et al. | 353/52 |
| 2009/0036158 A1 | 2/2009 | Fujinawa et al. | |
| 2009/0244087 A1* | 10/2009 | Okano | 345/589 |

FOREIGN PATENT DOCUMENTS

| | | |
|---|---|---|
| JP | 5088256 A | 4/1993 |
| JP | 2004289401 A | 10/2004 |
| JP | 2005094496 A | 4/2005 |
| JP | 2007074652 A | 3/2007 |
| JP | 2008135820 A | 6/2008 |
| JP | 2008244727 A | 10/2008 |
| WO | 2006057328 A1 | 6/2006 |

OTHER PUBLICATIONS

International Search Report and Written Opinion for PCT/JP2010/060899 dated Jul. 20, 2010.

* cited by examiner

*Primary Examiner* — Sonny Trinh
(74) *Attorney, Agent, or Firm* — Lowe, Hauptman & Ham, LLC

(57) ABSTRACT

According to one embodiment, a mobile electronic device includes a heat source unit that generates heat, a housing for holding the heat source unit; a temperature detection unit for detecting the temperature of the housing, a communication unit for performing communications, a sound output unit for outputting sound relating to the communications, and a control unit for controlling the heat source unit and the communication unit. The control unit changes sound output from the sound output unit depending on the temperature detected by the temperature detection unit and a set temperature.

17 Claims, 17 Drawing Sheets

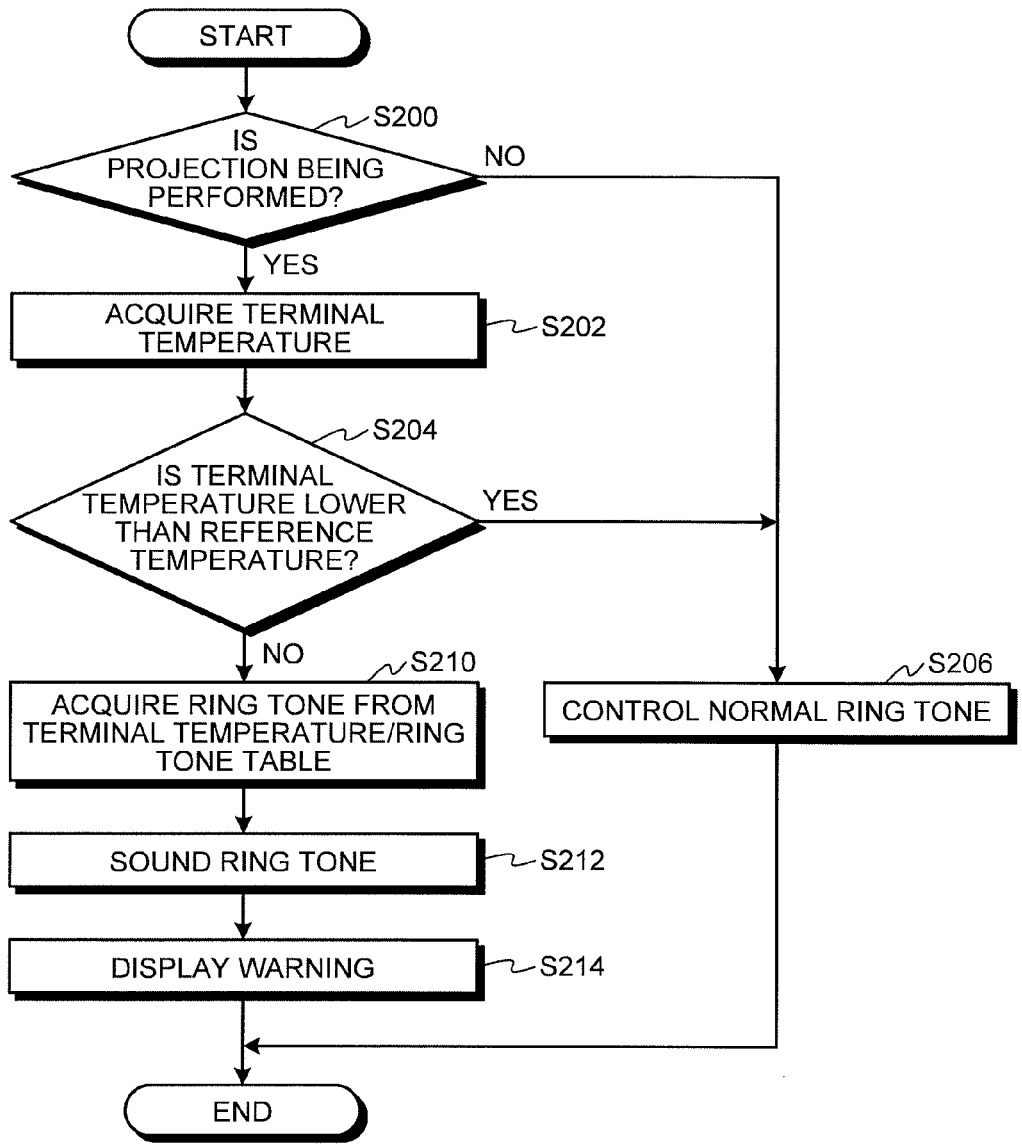

MOBILE ELECTRONIC DEVICE WITH SOUND OUTPUT FUNCTION

CROSS-REFERENCE TO RELATED APPLICATION

This application is a National Stage of PCT international application Ser. No. PCT/JP2010/060899 filed on Jun. 25, 2010 which is based upon and claims the benefit of priority from Japanese Patent Application No. 2009-152947, filed on Jun. 26, 2009.

FIELD

The present invention relates to a mobile electronic device that performs communications with another terminal and has a heat generation unit that generates heat.

BACKGROUND

In recent years, there has been proposed mobile electronic devices, such as a projector function-equipped mobile phone having a projector function and a communication function and a fuel cell-mounted mobile electronic device. When there is an incoming call during the use of the projector function or during the generation of electric power by the fuel cell, some of those devices notify an operator of the incoming call.

For example, Patent Literature 1 discloses a projector-equipped mobile phone which includes projection means for projecting an optical image, communication means for performing communications with an external device, and projection control means for causing the projection means to start performing a projection operation to notify the reception of an incoming call when an incoming call is received by the communication means while the projection by the projection means is being performed. Moreover, Patent Literature 1 discloses a method in which a ringing tone is used for notification.

Patent Literature 2 and Patent Literature 3 disclose a method in which, when information is received through a communication network, a reception notification image to notify the user of the reception of the information is projected on a user-viewable projection surface using a projector, regardless of the device being used as a projector.

CITATION LIST

Patent Literature

Patent Literature 1: Japanese Patent Application Laid-open No. 2007-74652
Patent Literature 2: Japanese Patent Application Laid-open No. 2004-289401
Patent Literature 3: Japanese Patent Application Laid-open No. 2005-94496

TECHNICAL PROBLEM

As disclosed in Patent Literature 1 to Patent Literature 3, the notification of a reception allows the operator to recognize the reception. However, when the projector is used or the electric power generation by the fuel cell is performed, the mobile electronic device may become hot from the generated heat. If a call is placed with the mobile electronic device during the hot state, the hand which holds the mobile electronic device or the ear grows warm, so that the user may not be comfortable during the call (communication) period.

For the foregoing reasons, there is a need for a mobile electronic device capable of an appropriate communication operation when communicating with another terminal.

SUMMARY OF THE INVENTION

According to the an aspect, a mobile electronic device includes a heat source unit that generates heat, a housing for holding the heat source unit; a temperature detection unit for detecting the temperature of the housing, a communication unit for performing communications, a sound output unit for outputting sound relating to the communications, and a control unit for controlling the heat source unit and the communication unit. The control unit changes sound output from the sound output unit depending on the temperature detected by the temperature detection unit and a set temperature.

According to another aspect, the control unit has a plurality of output modes in which settings for outputting sound relating to the communication differ, and performs control while switching the output modes between when the temperature detected by the temperature detection unit is equal to or higher than the set temperature and when the temperature by the temperature detection unit is lower than the set temperature.

According to another aspect, the control unit increases the volume level of the sound output from the sound output unit when the temperature detected by the temperature detection unit is equal to or higher than the set temperature compared to when the temperature detected by the temperature detection unit is lower than the set temperature.

According to another aspect, the sound output unit includes a receiver for outputting sound, and a speaker for outputting sound louder than that from the receiver. The control unit outputs sound using the speaker when the temperature detected by the temperature detection unit is equal to or higher than the set temperature.

According to another aspect, the control unit performs an inhibition control by which a call by the communication unit is not performed when the temperature detected by the temperature detection unit is equal to or higher than the set temperature.

According to another aspect, the inhibition control is a control including at least one of inhibiting an outgoing call, stopping a call, and rejecting an incoming call by the communication unit.

According to another aspect, when the temperature detected by the temperature detection unit is equal to or higher than the set temperature, the control unit estimates the time which will be taken until the temperature detected by the temperature detection unit is lower than the set temperature, and notifies that time estimated to be taken until the temperature detected by the temperature detection unit is lower than the set temperature.

According to another aspect, the mobile electronic device further includes a storage unit for storing the correspondence relationship between the temperature detected by the temperature detection unit and a sound output pattern output from the sound output unit. The control unit outputs the sound output pattern specified on the basis of the temperature detected by the temperature detection unit and the correspondence relationship when an incoming call is detected by the communication unit.

According to another aspect, a mobile electronic device includes a heat source unit that generates heat, a housing for holding the heat source unit, a temperature detection unit for detecting the temperature of the housing, a communication unit for performing communications, a receiver for outputting sound relating to the communication, a speaker for outputting a louder sound than the receiver, a storage unit for storing the correspondence between the temperature detected by the temperature detection unit and a sound output pattern and a control unit for controlling the operation of the heat source unit and the operation of the communication unit. The control unit reads the correspondence relationship from the storage unit, specifies the sound output pattern on the basis of the temperature detected by the temperature detection unit and the correspondence relationship, and outputs the specified sound output pattern from the speaker, when an incoming call from another terminal is detected.

According to another aspect, the heat source unit is an image projection unit for projecting an image.

According to another aspect, the temperature detection unit includes a detection element for detecting the temperature at a measurement point of the housing, and a temperature correspondence table in which the relationship between the temperature at the measurement point of the housing and the temperature in the outer surface of the housing. The temperature detection unit detects the temperature in the outer surface of the housing based on the temperature detected by the detection element and the temperature correspondence table.

According to another aspect, a measurement point of the temperature detection unit is near the sound output unit in the outer surface of the housing.

Advantageous Effects of Invention

A mobile electronic device according to the present invention changes the volume level of sound output from the sound output unit depending on whether the temperature of the housing is higher than a predetermined temperature or lower than the predetermined temperature, such that the operator can intuitively determine whether the temperature of the housing is higher than the predetermined temperature. Therefore, it is possible to suppress a call of the operator when the operator feels that the device is hot or heated, and to perform an appropriate communication operation when communicating with another terminal.

BRIEF DESCRIPTION OF DRAWINGS

FIG. 18 is a flowchart illustrating another example of the operation of the mobile electronic device.

DESCRIPTION OF EMBODIMENTS

Hereinafter, the embodiments will be described in detail with reference to the drawings. The following description is not intended to limit the invention. The components in the following description include those that can be easily thought of by persons skilled in the art, and substantially equivalents or those in an equivalent scope. Hereinafter, although a mobile phone is will be described as an example of a mobile electronic device, the application of the invention is not limited to mobile phones. For example, the invention may also be applied to Personal Handy-phone Systems (PHS), PDAs, mobile navigation devices, notebook personal computers, gaming devices, or the like.

Figure 1:
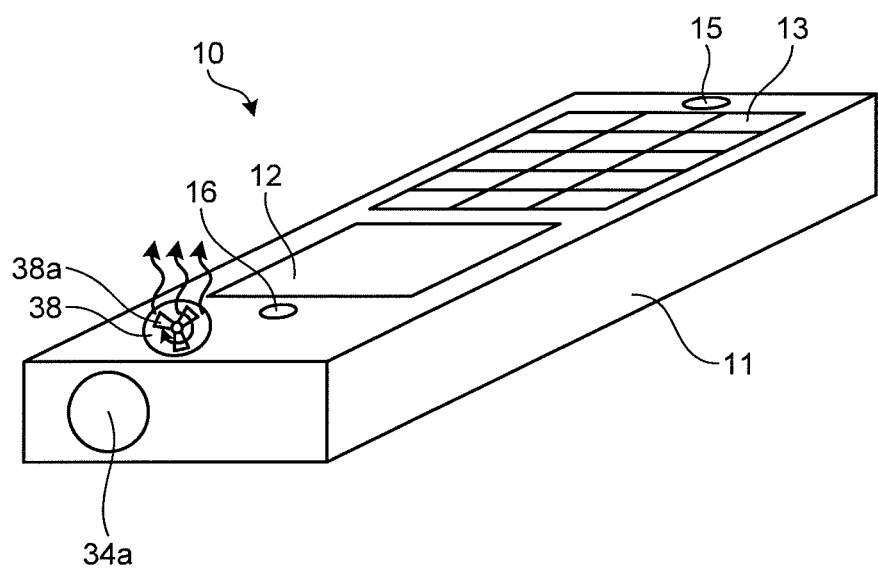
FIG. 1 is a perspective view illustrating the schematic configuration of a mobile electronic device of an embodiment.

First, the configuration of the appearance of a mobile electronic device will be described. FIG. 1 is a perspective view illustrating the schematic configuration of an embodiment of a mobile electronic device. A mobile electronic device 10 is a mobile phone having wireless communication function. The mobile electronic device 10 is a straight mobile phone in which respective units are accommodated inside a single box-shaped housing 11. Although the housing 11 has a single box shape in the present embodiment, it may be a foldable housing in which two members are connected to each other by a hinge, or it may be a housing in which two members are slid. A housing in which three or more members are connected to each other may be used.

The housing 11 is provided with a display 12 illustrated in FIG. 1 as a display unit. The display 12 displays a standby image as a predetermined image when the mobile electronic device 10 stands by for reception, a menu screen which is used to assist an operation on the mobile electronic device 10, or the like.

The housing 11 is provided with a plurality of operation keys 13 for accepting the input of the telephone number of the called party or letters at the time of mail composition or the like. The operation keys 13 constitute an operation unit 28 (see FIG. 2) of the mobile electronic device 10. The housing 11 is also provided with a microphone 15 which receives sound at the time of a call of the mobile electronic device 10, a receiver 16 which outputs sound at the time of a call of the mobile electronic device 10 (outputs sound relating to communication), and a cooling fan 38 which makes heat dissipate from the housing 11.

The upper surface (of which one side is a short side in a surface, which is close to the receiver 16, from among four surfaces perpendicular to the surface in which the operation keys 13 are provided) of the housing 11 is provided with a light emitting unit 34a of the projector 34 which projects an image.

Figure 2:
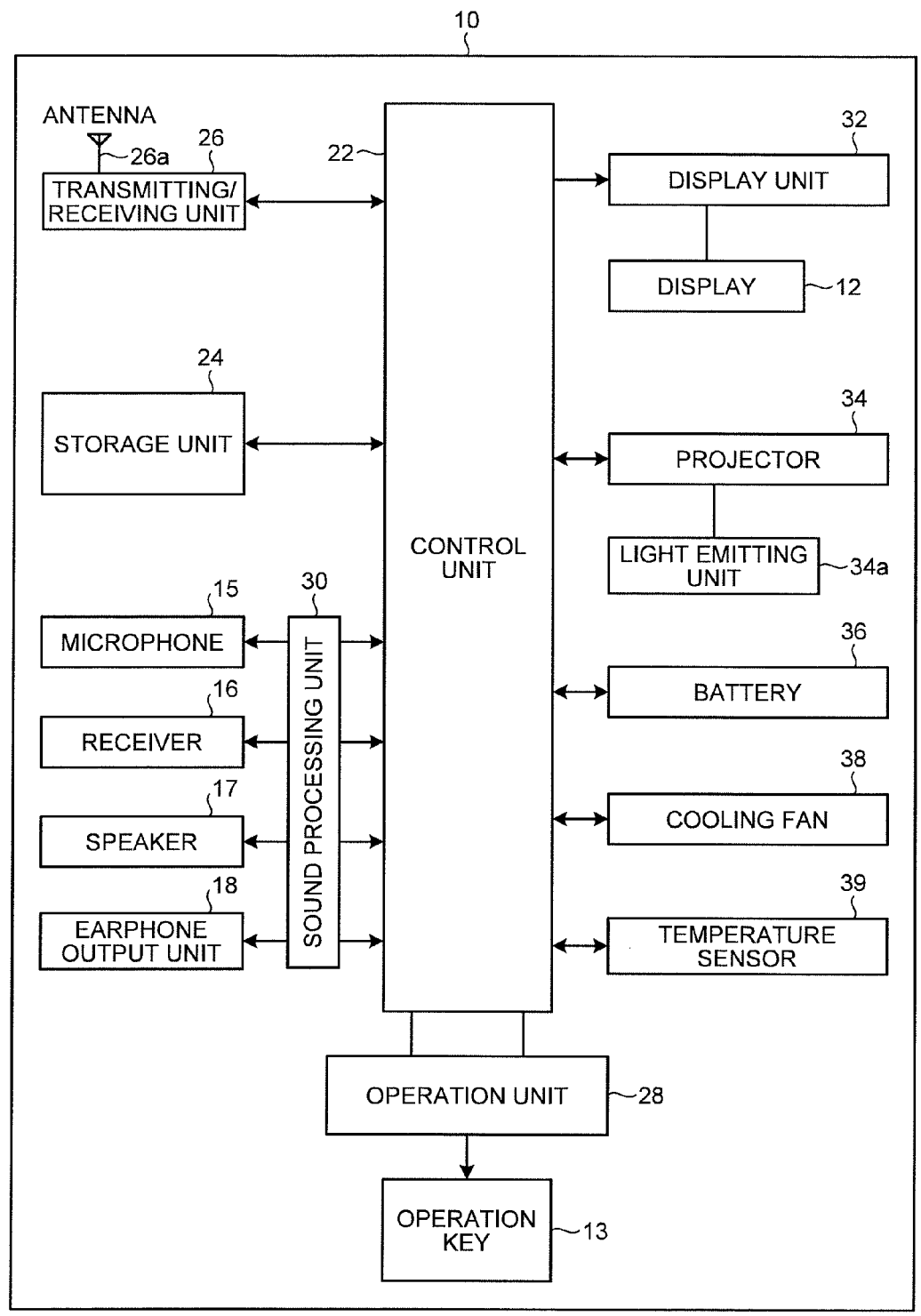
FIG. 2 is a block diagram illustrating the schematic configuration of a function of the mobile electronic device illustrated in FIG. 1.

FIG. 2 is a block diagram illustrating the schematic configuration of a function of the mobile electronic device illustrated in FIG. 1. As illustrated in FIG. 2, the mobile electronic device 10 includes a control unit 22, a storage unit 24, a transmitting/receiving unit 26, an operation unit 28, a sound processing unit 30, a display unit 32, a projector 34, a battery 36, the cooling fan 38, and a temperature sensor 39. The mobile electronic device 10 includes a speaker 17 and an earphone output unit 18 as a portion for outputting sound, in addition to the receiver 16. The speaker 17 directly outputs sound, and the earphone output unit 18 causes sound to be output from an earphone connected to the earphone output unit 18.

The control unit 22 is a processing unit, such as a Central Processing Unit (CPU), which integrally controls the whole operation of the mobile electronic device 10. That is, The control unit 22 controls the operations of the transmitting/receiving unit 26, the sound processing unit 30, the display unit 32, and the like in such a way that various processes of the mobile electronic device 10 are performed in an appropriate sequence in accordance with an operation from the operation unit 28 or software which is stored in the storage unit 24 of the mobile electronic device 10. The various processes of the mobile electronic device 10 include, for example, voice call which is performed through a line switching network, composition and transmission/reception of electronic mail, browsing of World Wide Web (Web) sites on Internet, and the like. The operations of the transmitting/receiving unit 26, the sound processing unit 30, the display unit 32, and the like include, for example, the transmission/reception of signals by the transmitting/receiving unit 26, input/output of sound by the sound processing unit 30, display of images by the display unit 32, and the like.

The control unit 22 performs a process based on program (s) (for example, an operating system program, an application program, or the like) stored in the storage unit 24. The control unit 22 includes, for example, a micro processor unit (MPU), and performs various processes of the mobile electronic device 10 in accordance with a sequence instructed by software. That is, the control unit 22 performs processes by sequentially reading command codes from an operating system program, an application program, or the like stored in the storage unit 24.

The control unit 22 has a function of executing a plurality of application programs. As the application programs which are executed by the control unit 22, for example, there are a plurality of application programs including an application program which performs control on the basis of a detection value by the temperature sensor, an application program which controls the driving of the projector, an image reproduction application program which reproduces a still image or a motion image, game application programs which run various games, and the like.

The storage unit 24 stores software and data which is used in the process performed in the control unit 22, and also stores a task which runs an application program for performing the controls on the basis of a detection value by the temperature sensor, a task which runs an application program for controlling the driving of the projector, a task which runs an image reproduction application program for reproducing a still image or a motion image, and a task which runs game application programs for running various games.

In addition to these tasks, the storage unit 24 also stores, for example, communications, downloaded sound data, software which is used by the control unit 22 for the control of the storage unit 24, an address book for saving and managing telephone numbers and e-mail addresses and the like of call parties, sound files, such as a dial tone or ring tone, temporary data which is used for the process of software, or the like. A computer program and/or temporary data which is used in the process of software is temporarily stored in a work area which is allocated to the storage unit 24 by the control unit 22. The storage unit 24 is constituted by, for example, a nonvolatile storage device (a nonvolatile semiconductor memory, such as a Read Only Memory (ROM), a hard disk, or the like), a readable/writable storage device (for example, Static Random Access Memory (SRAM), Dynamic Random Access Memory (DRAM)), or the like.

The transmitting/receiving unit 26 includes an antenna 26a, and it establishes a wireless signal path by a CDMA system or the like with a base station through a channel allocated by the base station and performs telephone communication and information communication with the base station.

The operation unit 28 is constituted by the operation keys 13, such as a power key, a call key, numeric keys, letter keys, direction keys, an OK key, and a send key, to which various functions are allocated. If each key is input by an operation of the user, a signal corresponding to the operation content is generated. The generated signal is input to the control unit 22 as an instruction of the user.

The sound processing unit 30 performs a process on a sound signal input to the microphone 15 or a sound signal output from the receiver 16, the speaker 17, or the earphone output unit 18. That is, the sound processing unit 30 amplifies sound input from the microphone 15, performs Analog Digital Conversion (AD conversion) and a signal process, such as encoding, to convert sound to digital sound data, and outputs digital sound data to the control unit 22. Processes, such as decoding, Digital Analog Conversion (DA conversion), and amplification, are performed on sound data transmitted from the control unit 22 to convert the sound data to an analog sound signal, and the analog sound signal is output to at least one of the receiver 16, the speaker 17, and the earphone output unit 18. Sound indicating an incoming call, call sound at the time of a hands-free operation, music, or the like can be output from the speaker 17. Call sound at the time of a hands-free operation, music, or the like can be output from the earphone output unit 18. The speaker 17 is a sound output mechanism which can output sound louder than the receiver 16.

The display unit 32 includes a display panel (the above-described display 12 etc.) which is constituted by a liquid crystal display (LCD) or an organic Electro-Luminescence (OEL) panel, and displays video based on video data or an image based on image data supplied from the control unit 22 on the display panel. With regard to the display unit 32, in addition to the display 12, for example, a sub display may be provided at a position which is exposed to the outside.

Figure 3:
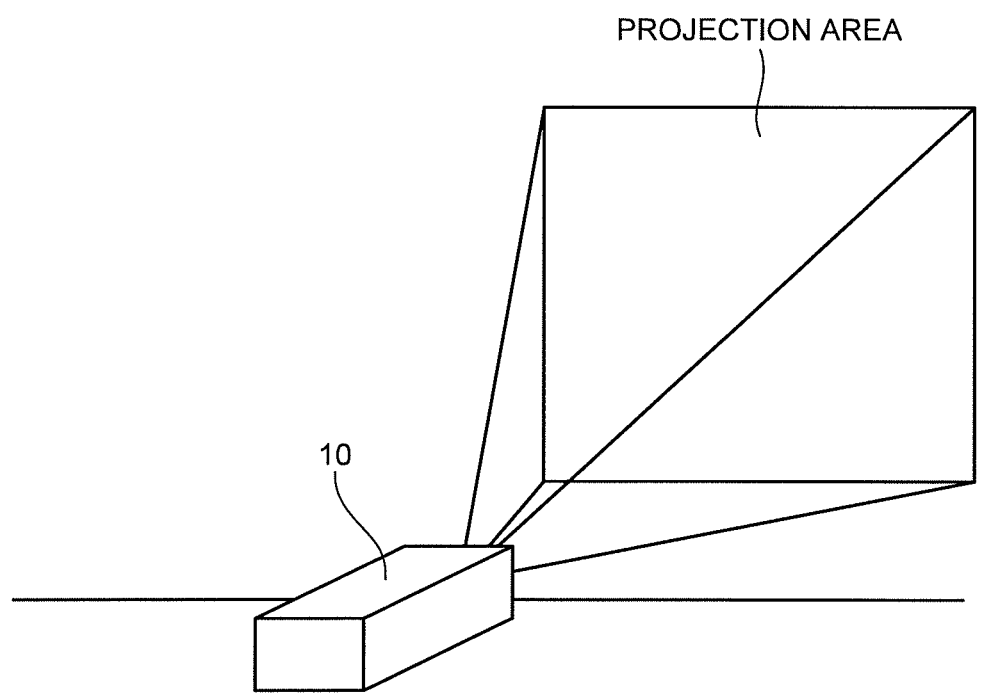
FIG. 3 is an explanatory view illustrating a state where an image is projected by the mobile electronic device illustrated in FIG. 1.

The projector 34 is an image projection system which projects an image and, as described above, is provided with the light emitting unit 34a which projects an image on the upper surface of the housing 11. FIG. 3 is an explanatory view illustrating a state where an image is projected on the mobile electronic device illustrated in FIG. 1. The mobile electronic device 10 projects an image from the light emitting unit 34a of the projector 34, that is, emits light which forms an image so that, as illustrated in FIG. 3, an image can be projected in a given area (projection area) of a wall surface or a screen which faces the upper surface of the housing 11. The projector 34 operates under the control of the control unit 22, and allows various kinds of images, for example, movies or presentation materials, to be transmitted from the control unit 22 and to be displayed in the projection area.

The projector 34 includes a light source and an optical system which switches the operation mode between whether or not to project light emitted from the light source in accordance with image data. For example, the projector 34 may be a projector in which a halogen light, an LED light source, or an LD light source is used as the light source, and a Liquid Crystal Display (LCD) or a Digital Micro-mirror Device (DMD) is used as the optical system. In this case, pixels of the optical system are disposed on the entire surface of the projection area to correspond to each pixel thereof, and turn on and off the light emitted from the light source according to an image to make the image projected on the entire surface of the projection area. Alternatively, the projector 34 may be a projector in which laser light is used as the light source, and a switching element for switching the operation mode between whether or not to transmit light emitted from the light source and a mirror for raster-scanning light passed through the switching element are uses as the optical system. In this case, the angle of light emitted from laser light is changed by the mirror such that light irradiated from the light source scans the entire surface of the projection area, thereby projecting an image in the projection area.

The battery (power supply) 36 is a rechargeable cell, and supplies charged power to the control unit 22 and the respective units through the control unit 22. The battery 36 is detachably held in the housing 11. The battery 36 is charged with power supplied from an external power supply through terminals or the like. The battery 36 may directly supply power to the respective units without passing through the control unit 22. The battery 36 may be embedded inside the housing 11 and may not be detachable.

The cooling fan 38 is a cooling mechanism which cools the respective units disposed inside the housing 11, in particular, the light-emitting portion of the projector 34. The cooling fan 38 includes blades 38a which rotates to cause air convection, a motor which rotates the blades 38a, and the like. The cooling fan 38 cools the respective units disposed inside the housing 11, thereby suppressing the failure of the mobile electronic device 10 due to overheating or excessive power consumption. In order to improve the cooling efficiency, the cooling fan 38 may be provided with a heat sink or the like in a region where the air is convected by the fan.

The temperature sensor 39 is temperature detection means disposed inside the housing 11, such as a thermocouple, a thermistor, a bimetal thermometer, etc. The temperature sensor 39 detects the temperature at a predetermined position inside the housing 11. The temperature sensor 39 sends the information of the detected temperature to the control unit 22. In the present embodiment, the control unit 22 performs an arithmetic operation using the temperature detected by the temperature sensor 39, thereby detecting the temperature of a predetermined portion. That is, a temperature detection unit of the invention is constituted by the functions of the temperature sensor 39 and the control unit 22. The mobile electronic device 10 basically has the above-described configuration.

Figure 4:
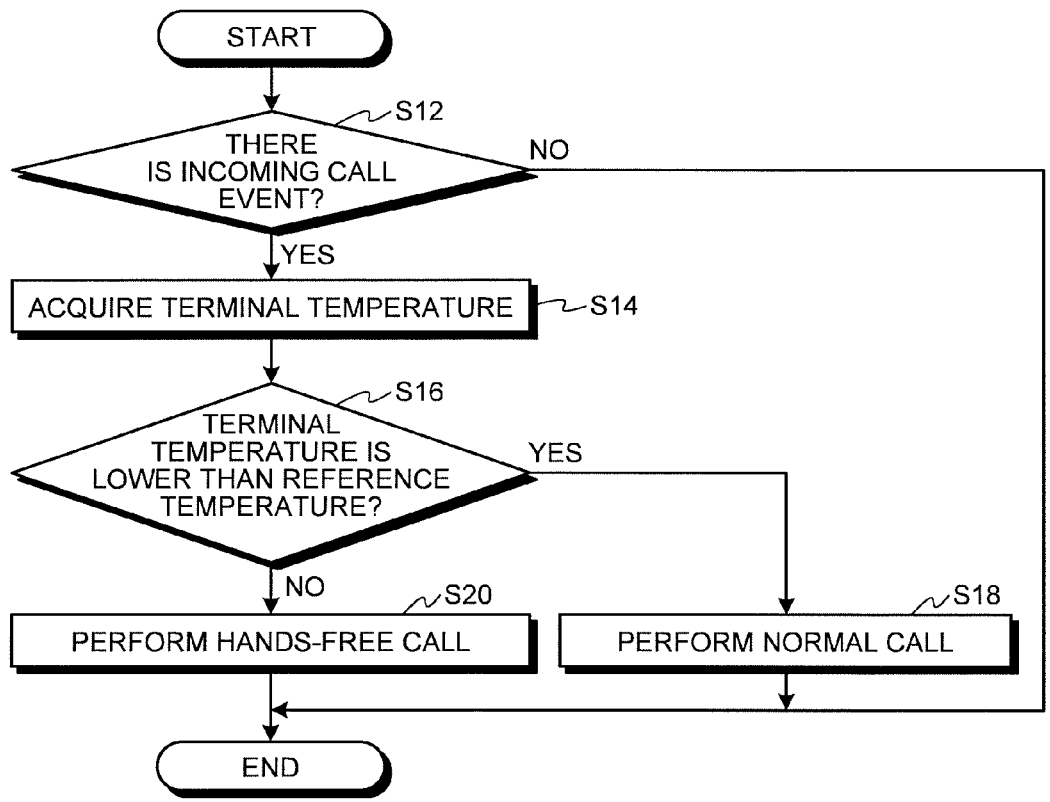
FIG. 4 is a flowchart illustrating an example of the operation of the mobile electronic device.

Next, the operation of the mobile electronic device 10, specifically, the processing operation of the control unit 22 based on the detection result of the temperature sensor 39 will be described with reference to FIG. 4. FIG. 4 is a flowchart illustrating an example of the operation of the mobile electronic device. The flowchart illustrated in FIG. 4 is a flowchart illustrating a processing operation when there is an incoming call from another terminal. The control unit 22 reads a task, which runs an application program for performing control on the basis of a detection value by the temperature sensor 39, from the storage unit 24, and runs the application program for performing control on the basis of a detection value by the temperature sensor 39.

First, the control unit 22 of the mobile electronic device 10 determines whether there is an incoming call event at Step S12. That is, it is determined whether there is an incoming call from another terminal but talking has not been started. If it is determined at Step S12 that there is no incoming call event (No), the control unit 22 ends the process.

If it is determined at Step S12 that there is an incoming call event (Yes), the control unit 22 acquires the terminal temperature at Step S14. The terminal temperature is the temperature of the surface of the housing 11, and in the present embodiment, the temperature at a predetermined position near the receiver 16. The terminal temperature is obtained from the detection value of the temperature sensor 39. Specifically, if the temperature near the temperature sensor 39 can be regarded as the temperature at the predetermined position near the receiver 16, the detection value of the temperature sensor 39 is set as the terminal temperature as it is. If the temperature sensor 39 is apart from the predetermined position, and the temperature near the temperature sensor 39 cannot be regarded as the temperature at the predetermined position near the receiver 16, the relation between the temperature of the temperature sensor 39 and the temperature at the predetermined position is calculated in advance, and the terminal temperature is calculated on the basis of the relation calculated in advance and the detected temperature of the temperature sensor 39. In this case, it is preferable to calculate the terminal temperature taking into consideration the operation situation of each unit, in particular, the driving state of the projector 34. Thus, it is possible to more accurately calculate the terminal temperature.

After the terminal temperature is acquired at Step S14, the control unit 22 determines whether the terminal temperature is within a reference temperature, that is, lower than the reference temperature, at Step S16. The reference temperature is the temperature at which the operator determines to be hot, and for example, 45 degrees. The reference temperature may be determined on the basis of room temperature or ambient temperature. For example, a temperature higher than the room temperature or ambient temperature by 10 degrees may be set as the reference temperature. The room temperature may be calculated from the difference between the temperature sensor 39 and a second temperature sensor provided at a position different from the temperature sensor 39. With regard to the ambient temperature, information on the ambient temperature of a place at which the mobile electronic device 10 is present may be acquired from a server or the like through the transmitting/receiving unit 26.

If it is determined at Step S16 that the terminal temperature is lower than the reference temperature (Yes), the control unit 22 performs a normal call at Step S18. A normal call refers to a call method in which sound from a call party is output from the receiver 16, and the operator bends his/her ear to the receiver 16 to perform a call. The mobile electronic device 10 is configured in such a manner that the operator can select various call methods other than the normal call when the normal call can be performed. When the normal call is performed, a call can be performed in an arbitrary mode selected by the operator. After performing the normal call at Step S18, the control unit 22 ends the process.

If it is determined at Step S16 that the terminal temperature is not lower than the reference temperature (No), that is, the terminal temperature is equal to or higher than the reference temperature, the control unit 22 performs a hands-free call at Step S20. When the hands-free call is performed, sound from a call party is output from the speaker 17 to perform the call. After performing the hands-free call at Step S20, the control unit 22 ends the process. The control unit 22 repeats the above-described process.

When the terminal temperature is equal to or higher than the reference temperature, the mobile electronic device 10 performs the hands-free call. Thus, when the housing 11 is at equal to or higher than a given temperature, the operator can perform a call without bending his/her ear to the receiver 16. That is, when the terminal temperature is equal to or higher than the reference temperature, the mobile electronic device 10 can prevent the operator from bending his/her face to the housing 11. Therefore, it is possible to suppress the use of the mobile electronic device 10 while the user feels that the device is hot or heated.

Figure 5:
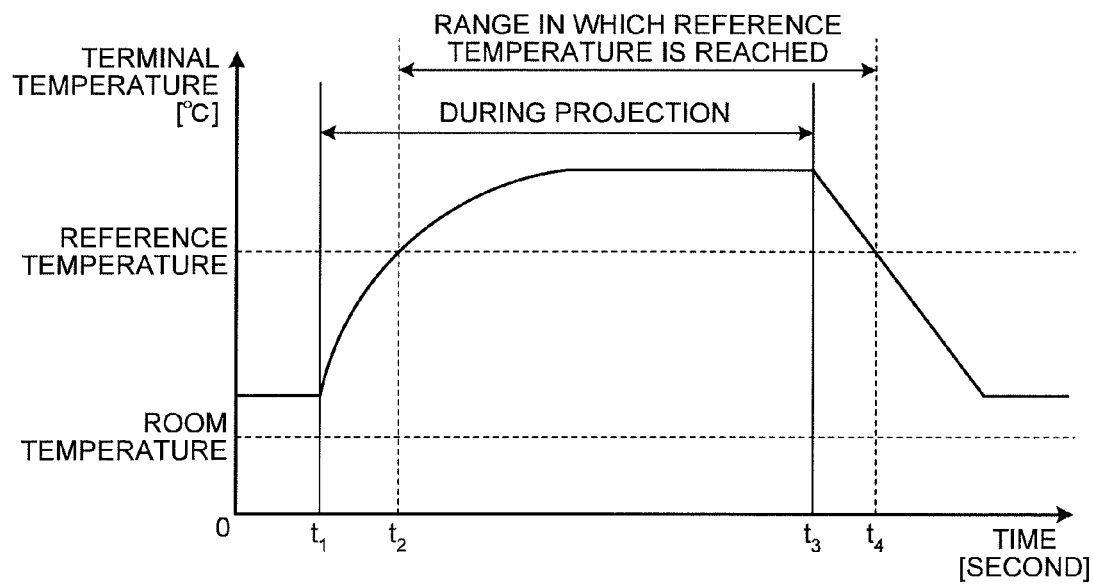
FIG. 5 is a graph illustrating an example of a change in temperature of the mobile electronic device.

Hereinafter, a specific example will be described. FIG. 5 is a graph illustrating an example of a change in temperature of a mobile electronic device. In the graph of FIG. 5, the vertical axis represents the terminal temperature [° C.], and the horizontal axis represents time [second]. The graph illustrated in FIG. 5 is an example where an image is projected by the projector 34 and the terminal temperature increases. As illustrated in FIG. 5, in a state where the projector 34 is not driven, the terminal temperature is detected as a temperature higher than the room temperature. In this state, if the projector 34 is activated and projection starts at the time $t_1$, the terminal temperature gradually increases and exceeds the reference temperature when a certain time has elapsed (in the drawing, the time $t_2$). Thereafter, the terminal temperature further increases and then gets constant at a certain temperature. While the projector 34 is being driven, the terminal temperature keeps constant at a certain high temperature which exceeds the reference temperature. Thereafter, if the driving of the projector 34 is stopped at the time $t_3$, the terminal temperature gradually drops to be lower than the reference temperature when a certain time has elapsed (in the drawing, the time $t_4$). Subsequently, the terminal temperature gradually drops to the temperature before the projector 34 is activated. The terminal temperature changes in the above-described manner, and when there is the event of an incoming call during a range of the time in which the reference temperature (including the temperature equal to the reference temperature) is reached (that is, from the time $t_2$ to the time $t_4$) as in FIG. 5, a call with a call party can be performed by a hands-free call, instead of a normal call. Therefore, when the housing 11 is at an equal or higher temperature than a given temperature, the volume level louder than a normal call is emitted, in such a way that the operator can perform a call without bending his/her ear to the receiver 16, thereby preventing the operator from feeling that the device is hot or heated at the time of a call.

The control unit 22 may be configured to display a message or symbol indicating that the temperature has increased or a message or symbol indicating that a call is performed by a hands-free call on the display unit 32 before a hands-free call is set at Step S20. In this way, the operator can accurately recognize the state of the mobile electronic device 10.

Step S S14 to S18 or Step S20 may be performed after the operator inputs an instruction to start a call. Alternatively, Step S S14 to S18 or Step S20 may be performed before the operator inputs the instruction to start a call, so that the operator is notified of a hands-free call or a normal call by the display unit 32 or the like, and after the operator inputs the instruction to start a call, a call may be performed by a set method. The instruction to start a call is input by the depression of a button (call key), sound input, the depression of a switch of a cradle, or the like.

In the foregoing embodiment, a case has been described where, at Step S12, there is an incoming call event, that is, an incoming call from another terminal. However, when a call is made from the mobile electronic device 10 to another terminal, that is, when an outgoing call is made, the same control may be performed. Step S S14 to S18 or Step S20 may be performed even during a call, so that if the terminal temperature is equal to or higher than the reference temperature, switching to a hands-free call may occur, and if the terminal temperature is lower than the reference temperature, switching to a normal call may occur. The switching from a hands-free call to a normal call may not automatically occur and may be selectable. As described above, when a call is placed, the above-described control is performed depending on the terminal temperature, in such a way that the operator can be prevented from feeling that the device is hot at the time of a call, making it possible to perform a call by an appropriate call method.

Figure 6:
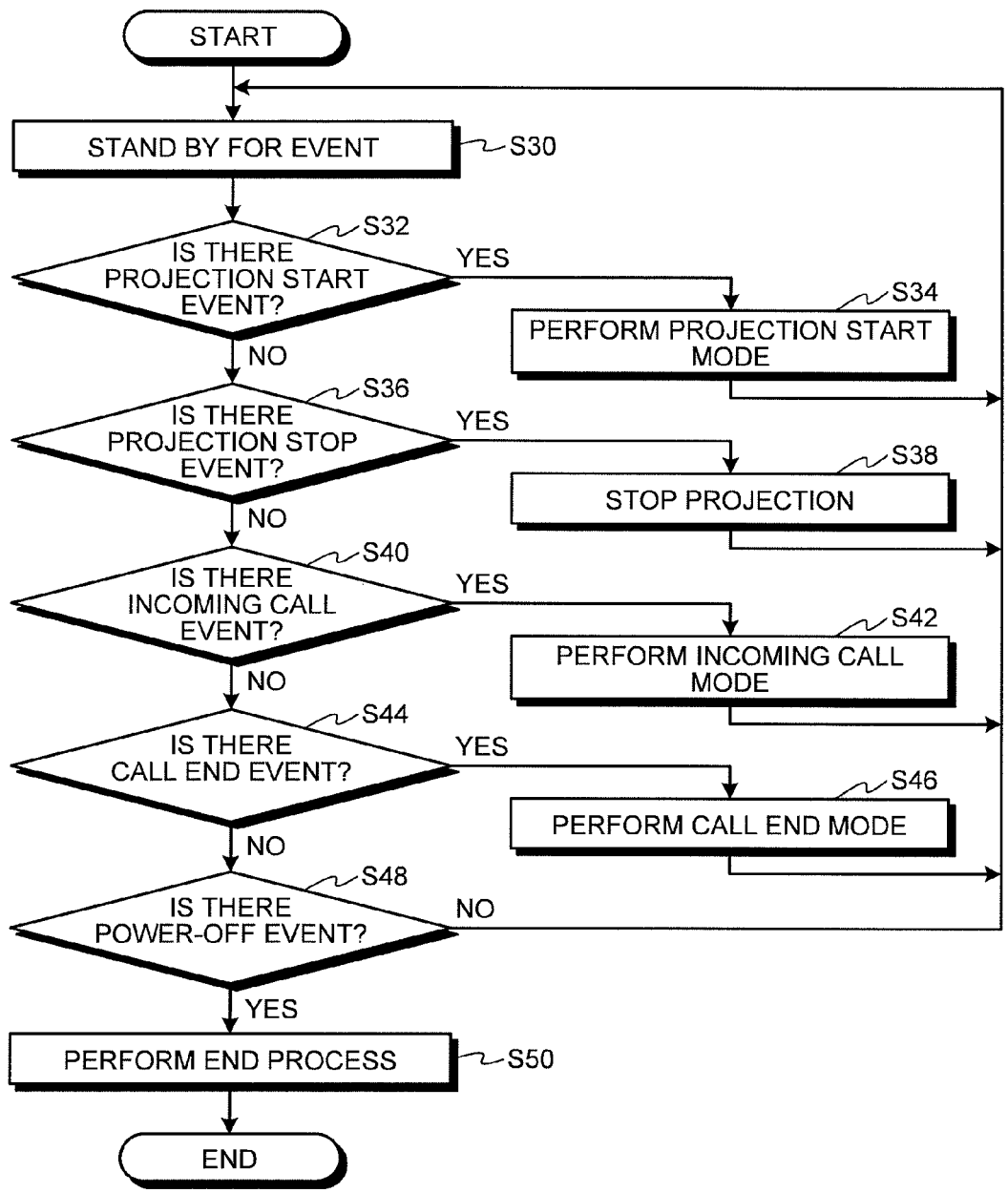
FIG. 6 is a flowchart illustrating another example of the operation of the mobile electronic device.

Next, another example of the operation of the mobile electronic device 10, specifically, the processing operation of the control unit 22 and the projection operation of the projector 34, based on the detection result of the temperature sensor 39, will be described with reference to FIGS. 6 to 10. FIG. 6 is a flowchart illustrating another example of the operation of the mobile electronic device. In this example, the control unit 22 reads, from the storage unit 24, a task which runs an application program for controlling the driving of the projector and a task which runs an application program for performing the controls on the basis of the detection value by the temperature sensor, and runs the application program for controlling the driving of the projector 34 and the application program for performing the controls on the basis of the detection value by the temperature sensor.

First, as illustrated in FIG. 6, the control unit 22 stands by for an event at Step S30, and if the event is detected, proceeds to perform the process of Step S32. An event refers to an input such as an instruction from the operator, a notification from another terminal or a base station, or the like, which is necessary for a process by (an application program of) the control unit 22.

If the event is detected at Step S30, the control unit 22 determines whether the detected event is a projection start event at Step S32. A projection start event refers to an instruction for starting the projection of an image by the projector 34. If it is determined at Step S32 that the detected event is the projection start event (Yes), the control unit 22 performs a process of a projection start mode at Step S34, then proceeds to perform the process of Step S30, and returns to a state standing by for an event.

Figure 7:
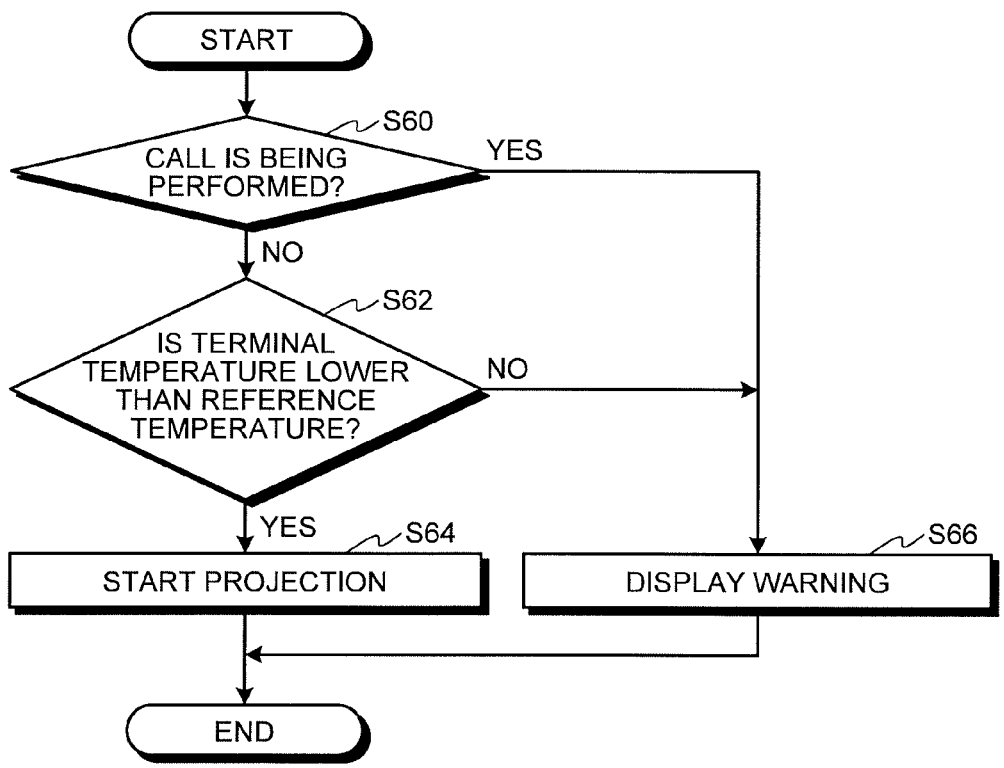
FIG. 7 is a flowchart specifically illustrating the operation of the flowchart illustrated in FIG. 6.

The process of the projection start mode will be described with reference to FIG. 7. FIG. 7 is a flowchart specifically illustrating the process of the projection start mode of Step S34. If it is determined at Step S32 that the detected event is the projection start event, the control unit 22 determines whether a call is being performed at Step S60.

If it is determined at Step S60 that a call is being performed (Yes), the control unit 22 proceeds to perform the process of Step S66. If it is determined at Step S60 that a call is not being performed (No), the control unit 22 determines whether the terminal temperature is lower than a reference temperature at Step S62. The reference temperature at Step S62 may be equal to or different from the reference temperature as the reference for the determination on whether the above-described call is performed by a hands-free call or a normal call. The reference temperature at Step S62 can be set to be higher than the reference temperature for setting a call method, and as the reference for setting, the temperature at which the performance of the projector 34 is likely to be degraded is exemplified. If it is determined at Step S62 that the terminal temperature is lower than the reference temperature (Yes), the control unit 22 starts the projection of an image by the projector 34 at Step S64. The control unit 22 proceeds to perform the process of Step S30 while projecting an image from the projector 34.

If it is determined at Step S60 to be Yes or at Step S62 that the terminal temperature is not lower than the reference temperature (No), the control unit 22 displays a warning at Step S66. The warning display is a notification which is output toward the operator, and is displayed on the display unit 32. The warning display may differ between when it is determined at Step S60 to be Yes and when it is determined at Step S62 to be No. For example, when it is determined at Step S60 to be Yes, since a call is being performed, the warning display indicating that the projector 34 cannot be activated unless a call is stopped may be performed. When it is determined at Step S62 to be No, the warning display indicating that the projector 34 cannot be activated because the terminal temperature is equal to or higher than a prescribed temperature may be performed. After the warning is displayed at Step S66, the control unit 22 proceeds to perform the process of Step S30.

Returning to FIG. 6, if it is determined at Step S32 that the detected event is not the projection start event (No), the control unit 22 determines whether the detected event is a projection stop event at Step S36. A projection stop event refers to an instruction for stopping the projection of an image by the projector 34. If it is determined at Step S36 that the detected event is the projection stop event (Yes), the control unit 22 stops the projection of an image by the projector 34 at Step S38, then proceeds to perform the process of Step S30, and returns to a state standing by for an event.

If it is determined at Step S36 that the detected event is not the projection stop event (No), the control unit 22 determines whether the detected event is an incoming call event at Step S40. An incoming call event refers to an input indicating that an incoming call from another terminal is detected. If it is determined at Step S40 that the detected event is the incoming call event (Yes), the control unit 22 performs a process of an incoming call mode at Step S42, then proceeds to perform the process of Step S30, and returns to a state standing by for an event.

Figure 8:
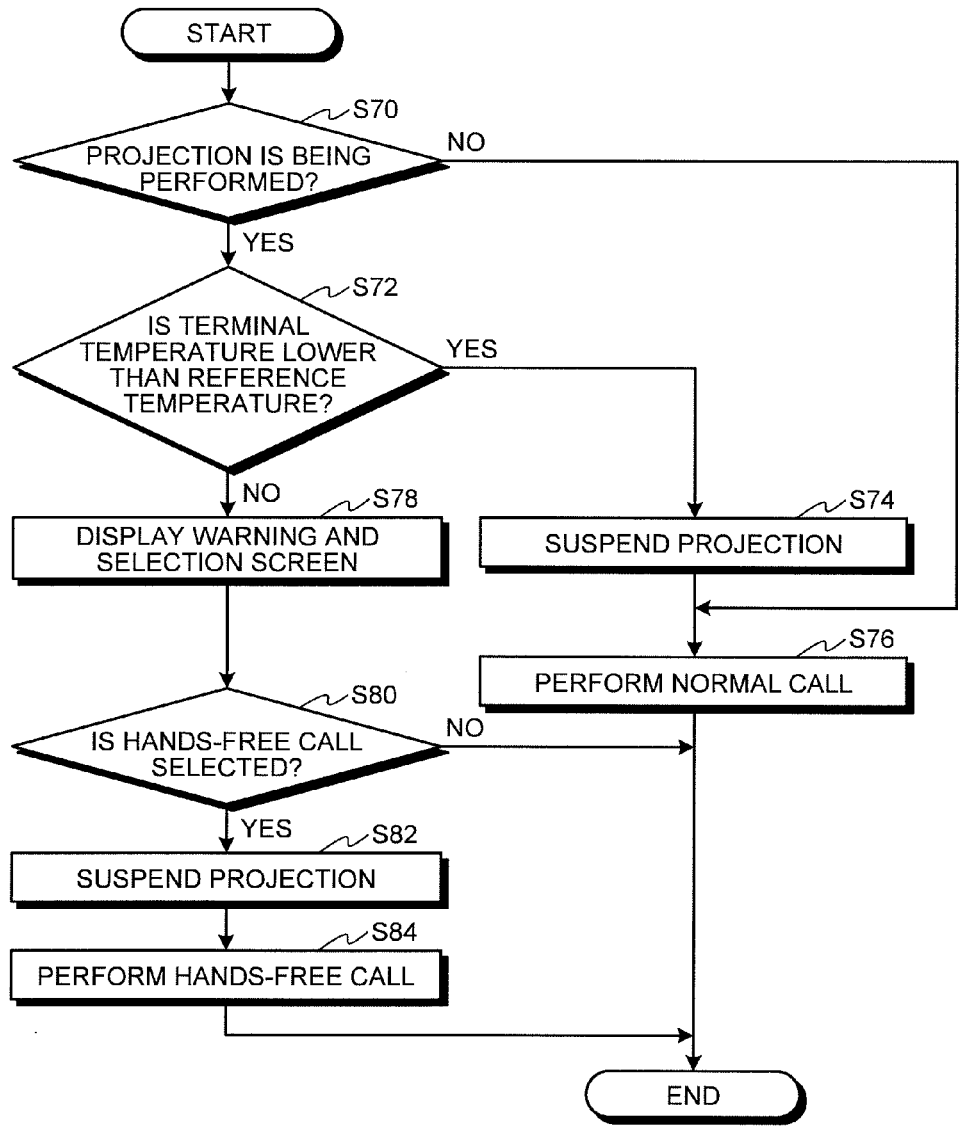
FIG. 8 is a flowchart specifically illustrating the operation of the flowchart illustrated in FIG. 6.

The process of the incoming call mode will be described with reference to FIG. 8. FIG. 8 is a flowchart specifically illustrating the process of the incoming call mode of Step S42. If it is determined at Step S40 that the detected event is the incoming call event, the control unit 22 determines whether projection is being performed at Step S70. That is, it is determined whether an image is being projected by the projector 34. If it is determined at Step S70 that projection is not performed (No), the control unit 22 proceeds to perform the process of Step S76.

If it is determined at Step S70 that projection is being performed (Yes), the control unit 22 determines whether the terminal temperature is lower than the reference temperature at Step S72. The reference temperature at Step S72 is the same reference temperature as the reference temperature for the determination at Step S16 described above. If it is determined at Step S72 that the terminal temperature is lower than the reference temperature (Yes), the control unit 22 suspends the projection of an image by the projector 34 at Step S74, and proceeds to perform the process of Step S76. If it is determined at Step S70 to be No or the projection is suspended at Step S74, the control unit 22 performs a normal call at Step S76. That is, if the projection of an image by the projector 34 is not performed, or it is determined that the terminal temperature is lower than the reference temperature, the control unit 22 starts a call by a normal call. Thereafter, the control unit 22 proceeds to perform the process of Step S30.

If it is determined at Step S72 that the terminal temperature is not lower than the reference temperature (No), that is, the terminal temperature is equal to or higher than the reference temperature, the control unit 22 displays a warning and selection screen at Step S78. The warning and selection screen is a screen on which both a warning message and a selection message are displayed. The warning message is a message indicating that the terminal temperature is equal to or higher than the reference temperature, and it is difficult to perform the call as a normal call. The selection message is a message relating to the selection of whether or not to perform a call by a hands-free call. The operator inputs an instruction to determine whether or not to perform a call as a hands-free call on the basis of the selection notification.

After the warning and selection screen is displayed at Step S78, the control unit 22 determines whether a hands-free call is selected at Step S80. If it is determined at Step S80 that a hands-free call is not selected (No), for example, the determination not to perform a hands-free call is input, the control unit 22 ends the process of the incoming call mode as it is, and proceeds to perform the process of Step S30. In this case, the projection of an image by the projector 34 is continued.

If it is determined at Step S80 that a hands-free call is selected (Yes), the control unit 22 suspends the projection of an image by the projector 34 at Step S82, and starts a call by a hands-free call at Step S84. Thereafter, the control unit 22 proceeds to perform the process of Step S30.

Returning to FIG. 6, if it is determined at Step S40 that the detected event is not the incoming call event (No), the control unit 22 determines whether the detected event is a call end event at Step S44. A call end event refers to an instruction for ending a call with another terminal. If it is determined at Step S44 that the detected event is the call end event (Yes), the control unit 22 performs a process of a call end mode at Step S46, then proceeds to perform the process of Step S30, and returns to a state standing by for an event.

Figure 9:
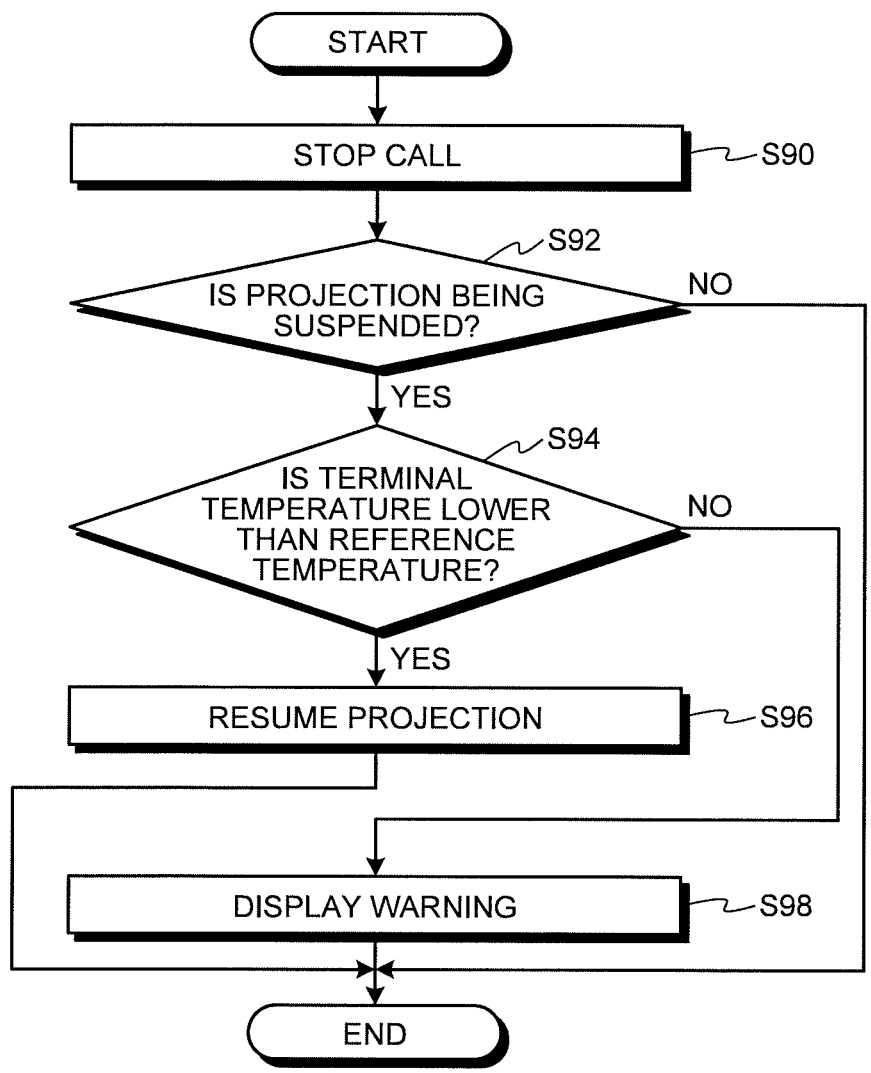
FIG. 9 is a flowchart specifically illustrating the operation of the flowchart illustrated in FIG. 6.

The process of the call end mode will be described with reference to FIG. 9. FIG. 9 is a flowchart specifically illustrating the process of the call end mode of Step S46. If it is determined at Step S44 that the detected event is the call end event, the control unit 22 stops a call at Step S90. After the call is stopped at Step S90, the control unit 22 determines whether the projection of an image by the projector 34 is suspended at Step S92. That is, it is determined whether the projection of an image is suspended at Step S74 or at Step S82 described above. If it is determined at Step S92 that the projection is not suspended (No), the control unit 22 ends the process of the call end mode, and proceeds to perform the process of Step S30.

If it is determined at Step S92 that projection is suspended (Yes), the control unit 22 determines whether the terminal temperature is lower than the reference temperature at Step S94. The reference temperature at Step S94 is the same reference temperature as the reference temperature for the determination at Step S62 described above. If it is determined at Step S94 that the terminal temperature is lower than the reference temperature (Yes), the control unit 22 resumes the projection of an image by the projector 34 at Step S96. After Step S96 ends, the control unit 22 ends the process of the call end mode, and proceeds to perform the process of Step S30.

If it is determined at Step S94 that the terminal temperature is not lower than the reference temperature (No), that is, the terminal temperature is equal to or higher than the reference temperature, the control unit 22 displays a warning screen at Step S98. The warning screen is a message (warning message) indicating that the terminal temperature is equal to or higher than the reference temperature, and the projection of an image by the projector 34 may not be performed. If Step S98 ends, the control unit 22 ends the process of the call end mode, and proceeds to perform the process of Step S30. In this case, the control unit 22 proceeds to perform the process of Step S30 without resuming the projection of an image by the projector 34.

Returning to FIG. 6, if it is determined at Step S44 that the detected event is not the call end event (No), the control unit 22 determines whether the detected event is a power-off event at Step S48. A power-off event refers to an instruction which turns off the power supply of the mobile electronic device 10. That is, the power-off event is an instruction which stops the driving of the mobile electronic device 10. If it is determined at Step S48 that the detected event is not the power-off event (No), the control unit 22 proceeds to perform the process of Step S30, and returns to a state standing by for an event. If it is determined at Step S48 that the detected event is the power-off event (Yes), the control unit 22 performs an end process, that is, a process for ending each software program and stopping the driving of the mobile electronic device 10 at Step S50, and the process ends.

Figure 10:
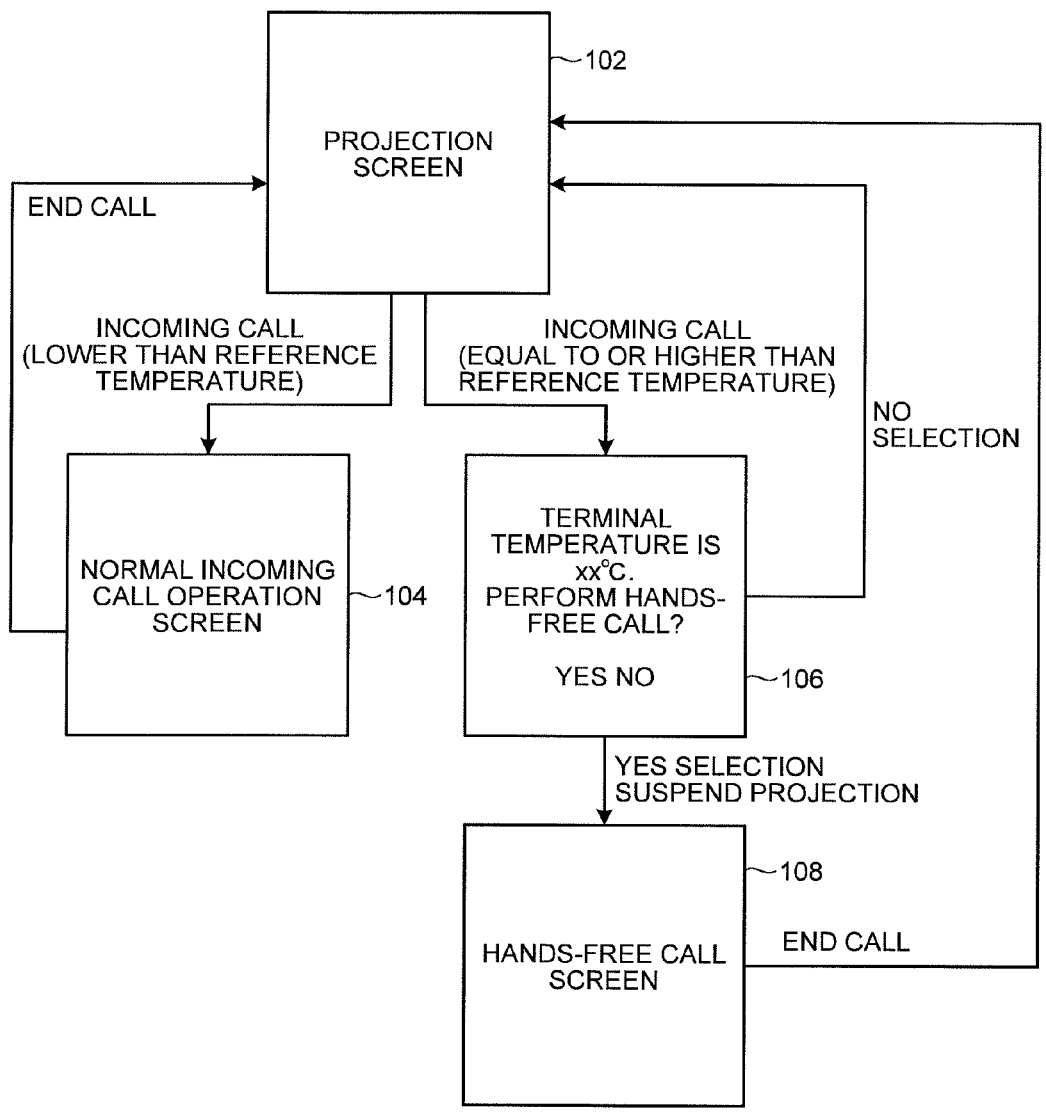
FIG. 10 is an explanatory view illustrating the operation of the mobile electronic device illustrated in FIG. 6.

The process by the control unit 22 is performed in the above-described manner. Next, an example of a change of an image to be displayed on the display unit by a process of FIGS. 6 to 9 will be described with reference to FIG. 10. FIG. 10 is an explanatory view illustrating the operation of the mobile electronic device illustrated in FIG. 6. For example, while an image is being projected by the projector 34, as illustrated in FIG. 10, an image corresponding to the image being projected or a processing screen thereof is displayed as a projection screen 102. In this state, if there is an incoming call, the process progresses from Step S40 to Step S72, in which, when the terminal temperature is lower than the reference temperature, a normal incoming call operation screen 104 is displayed, and a call by a normal call is performed. Thereafter, when the normal call ends, the process of the call end mode is performed, and if the terminal temperature is lower than the reference temperature, the projection is resumed and the projection screen 102 is displayed.

When the terminal temperature is equal to or higher than the reference temperature at the time of an incoming call, as illustrated in FIG. 10, a warning and selection screen 106 including a warning message "TERMINAL TEMPERATURE IS xx° C." and a selection "PERFORM HANDS-FREE CALL? YES NO" is displayed (Step S78). Thereafter, if (NO) is selected, a call is not started, and the projection screen 102 is returned. Meanwhile, if (YES) is selected, the projection of an image by the projector 34 is suspended, a hands-free call starts, and a hands-free call screen 108 is displayed. Thereafter, when the call ends, the process of the call end mode is performed, and if the terminal temperature is lower than the reference temperature, the projection is resumed and the projection screen 102 is displayed.

In the above embodiment, sound is output from the speaker 17, in the case of a hands-free call. However, sound may be output from the receiver 16, in such a way that it is not necessary for the operator to bend his/her ear to the receiver 16. Sound may be output from the earphone output unit 18.

In the above embodiment, a call can be performed in a mode other than a normal call. However, the invention is not limited thereto. When the terminal temperature is higher than the reference temperature, a call may be inhibited even if there is an incoming call. That is, at Step S20 of FIG. 4, call inhibition may be set without performing a hands-free cal. In this way, inhibiting a call can possibly prevents the operator from being in contact with the mobile electronic device 10 when the terminal temperature is equal to or higher than the reference temperature, thereby further reducing a possibility that the operator feels that the device is hot or heated.

When the call inhibition is set, that is, a call is inhibited, it is preferable to notify the operator and/or another terminal that a call is inhibited. By doing so, it is possible for the operator to know the reason for which a call is not performed. It is also possible for the operator of another terminal to know the reason for which a call is not performed. Accordingly it is possible to suppress time and effort that the operator of another terminal calls many times in a short time while thinking that the receiving call party is unaware of a call.

When call inhibition is set, that is, a call is inhibited, it is preferable to estimate the time which will be taken until the terminal temperature is lower than the reference temperature and to notify the time to the operator and/or another terminal. In this way, it is possible to recognize the expected time at which a call can be performed, such that the operator and the operator of another terminal can make an outgoing call when an appropriate time has elapsed, thereby efficiently performing an operation.

Figure 11:
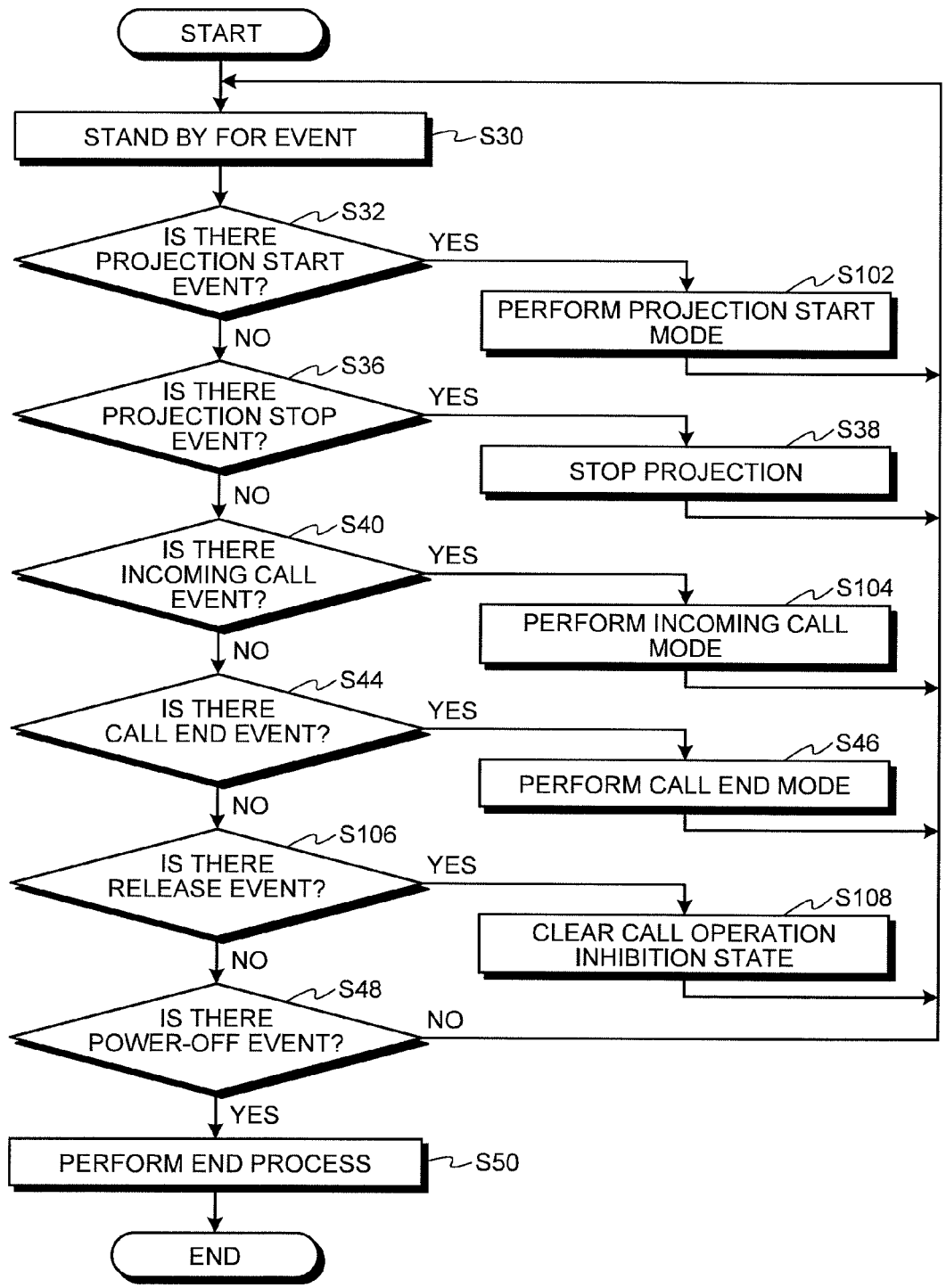
FIG. 11 is a flowchart illustrating another example of the operation of the mobile electronic device.

Hereinafter, another example of the operation of the mobile electronic device 10, specifically, the processing operation of the control unit 22 and the projection operation of the projector 34, in a case where a call is inhibited when the terminal temperature is equal to or higher than the reference temperature, will be described with reference to FIGS. 11 to 15. FIG. 11 is a flowchart illustrating another example of the operation of the mobile electronic device. The control operation illustrated in FIG. 11 is the same as the control operation illustrated in FIG. 6 except some parts, thus detailed description of the same process parts will not be repeated. Hereinafter, a process specific to this control will be described.

First, as illustrated in FIG. 11, the control unit 22 stands by for an event at Step S30, and if the event is detected, proceeds to perform the process of Step S32. If the event is detected at Step S30, the control unit 22 determines whether the detected event is the projection start event at Step S32. If it is determined at Step S32 that the detected event is the projection start event (Yes), the control unit 22 performs a process of a projection start mode at Step S102, then performs the process of Step S30, and returns to a state standing by for an event.

Figure 12:
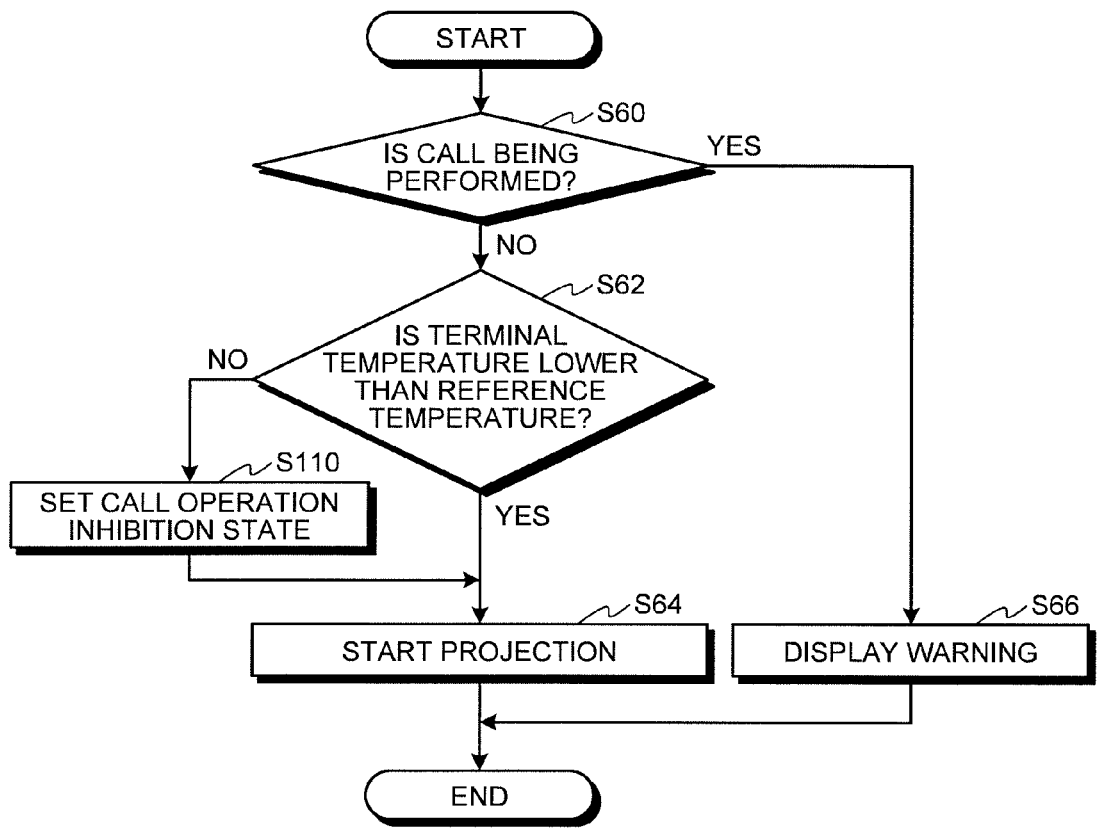
FIG. 12 is a flowchart specifically illustrating the operation of the flowchart illustrated in FIG. 11.

The process of the projection start mode will be described with reference to FIG. 12. FIG. 12 is a flowchart specifically illustrating the process of the projection start mode of Step S102. The control operation illustrated in FIG. 12 is the same as the control operation illustrated in FIG. 7 except some parts, thus detailed description of the same process parts will not be repeated. Hereinafter, a process specific to this control will be described. If it is determined at Step S32 that the detected event is the projection start event, the control unit 22 determines whether a call is being performed at Step S60.

If it is determined at Step S60 that a call is being performed (Yes), the control unit 22 proceeds to perform Step S66. If it is determined at Step S60 to be (Yes), the control unit 22 displays a warning at Step S66. The warning display is a notification which is output toward the operator, and is displayed on the display unit 32. As the warning display, since a call is being performed, warning display indicating that the projector 34 cannot be activated unless a call is stopped may be performed. After the warning is displayed at Step S66, the control unit 22 proceeds to perform the process of Step S30.

If it is determined at Step S60 that a call is not being performed (No), the control unit 22 determines whether the terminal temperature is lower than the reference temperature at Step S62. The reference temperature at Step S62 of FIG. 12 is the same reference temperature as the reference temperature at Step S16 described above. If it is determined at Step S62 that the terminal temperature is not lower than the reference temperature (No), the control unit 22 sets a call operation inhibition state at Step S110. A call operation inhibition state refers to a state in which an outgoing call and a call operation are not performed. In this state, even when the operator performs an operation, it is impossible to place or receive a call. Although a call is inhibited in this example, the call operation inhibition state may be set in a stepwise manner depending on the terminal temperature. For example, when the terminal temperature is higher than the reference temperature by 5 degrees, a hands-free call may be permitted, and when the terminal temperature is higher than the reference temperature by 10 degrees, a call may be completely inhibited. After the call operation inhibition state is set at Step S110, the control unit 22 proceeds to perform the process of Step S64.

If it is determined at Step S62 that the terminal temperature is lower than the reference temperature (Yes), or Step S110 ends, the control unit 22 starts the projection of an image by the projector 34 at Step S64. The control unit 22 proceeds to perform the process of Step S30 while projecting the image from the projector 34.

Returning to FIG. 11, if it is determined at Step S32 that the detected event is not the projection start event (No), the control unit 22 determines whether the detected event is the projection stop event at Step S36. If it is determined at Step S36 that the detected event is the projection stop event (Yes), the control unit 22 stops the projection of an image by the projector 34 at Step S38, then proceeds to perform the process of Step S30, and returns to a state standing by for an event.

If it is determined at Step S36 that the detected event is not the projection stop event (No), the control unit 22 determines whether the detected event is the incoming call event at Step S40. If it is determined at Step S40 that the detected event is the incoming call event (Yes), the control unit 22 performs a process of an incoming call mode at Step S104, then proceeds to perform the process of S30, and returns to a state standing by for an event.

Figure 13:
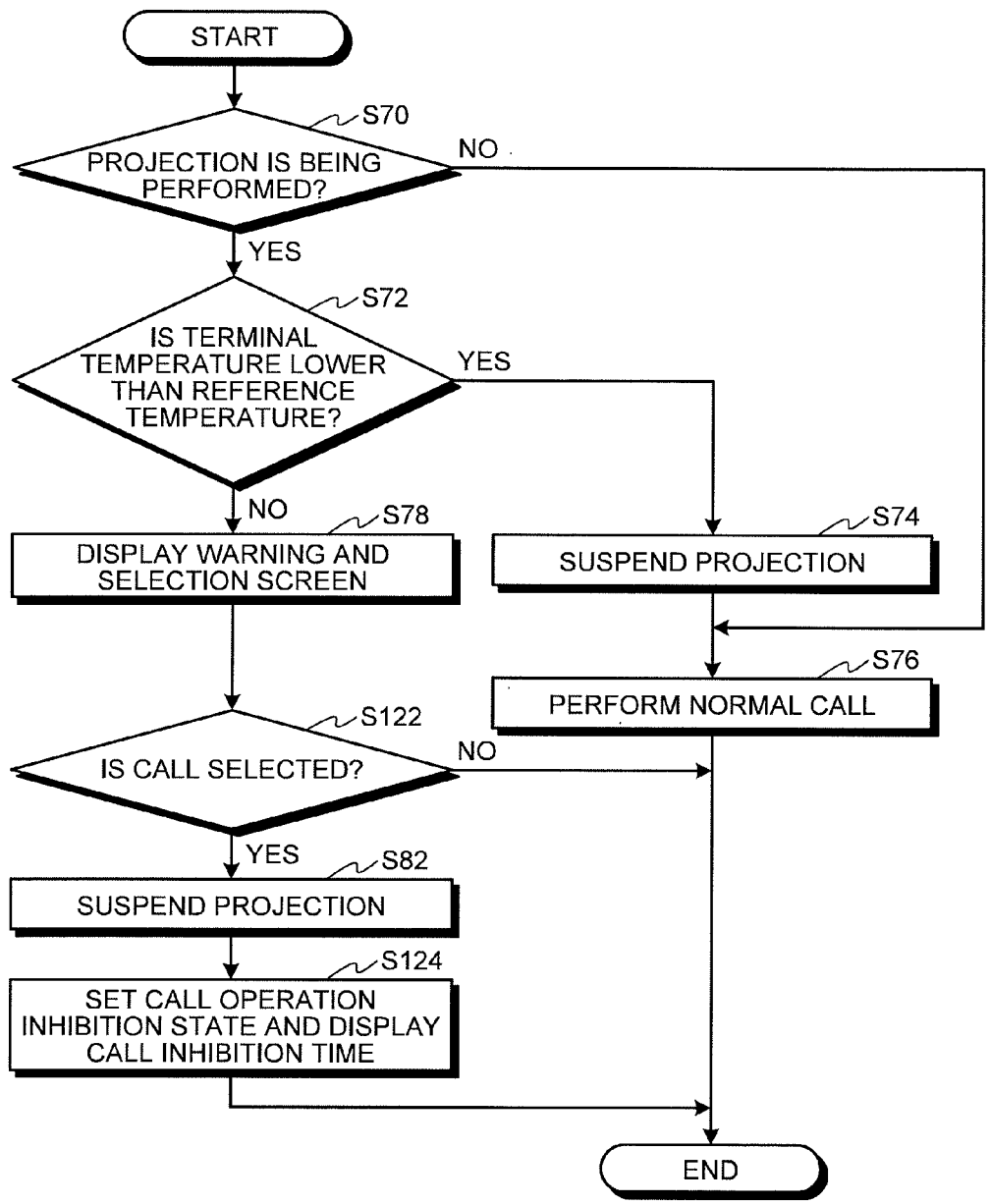
FIG. 13 is a flowchart specifically illustrating the operation of the flowchart illustrated in FIG. 11.

The process of the incoming call mode will be described with reference to FIG. 13. FIG. 13 is a flowchart specifically illustrating the process of the incoming call mode of Step S104. The control operation illustrated in FIG. 13 is the same as the control operation illustrated in FIG. 8 except some parts, thus detailed description of the same process parts will not be repeated. Hereinafter, a process specific to this control will be described. If it is determined at Step S40 that the detected event is the incoming call event, the control unit 22 determines whether projection is being performed at Step S70. That is, it is determined whether an image is being projected by the projector 34. If it is determined at Step S70 that projection is not being performed (No), the control unit 22 proceeds to perform the process of Step S76.

If it is determined at Step S70 that projection is being performed (Yes), the control unit 22 determines whether the terminal temperature is lower than the reference temperature at Step S72. The reference temperature at Step S72 is the same reference temperature as the reference temperature for the determination at Step S16 described above. If it is determined at Step S72 that the terminal temperature is lower than the reference temperature (Yes), the control unit 22 suspends the projection of an image by the projector 34 at Step S74, and proceeds to perform the process of Step S76. If it is determined at Step S70 to be (No) or if the projection was suspended at Step S74, the control unit 22 performs a normal call at Step S76. That is, if the projection of an image by the projector 34 is not performed, or it is determined that the terminal temperature is lower than the reference temperature, the control unit 22 starts a call by a normal call. Thereafter, the control unit 22 proceeds to perform the process of Step S30.

If it is determined at Step S72 that the terminal temperature is not lower than the reference temperature (No), that is, the terminal temperature is equal to or higher than the reference temperature, the control unit 22 displays a warning and selection screen at Step S78. The warning and selection screen is a screen on which both a warning message and a selection message are displayed. The warning message is a message indicating that it is difficult to perform the call because projection is being performed and that it will take a predetermined time to perform a call. The selection message is a message relating to the selection of whether or not to stop projection for performing a call. The operator inputs an instruction to determine whether or not to stop projection for performing a call on the basis of the selection notification.

After the warning and selection screen is displayed at Step S78, the control unit 22 determines whether a call is selected, at Step S122. If it is determined at Step S122 that a call is not selected (No), for example, the determination not to perform a call is input, the control unit 22 ends the process of the incoming call mode as it is, and proceeds to perform the process of Step S30. In this case, the projection of an image by the projector 34 is continued.

If it is determined at Step S122 that a call is selected (Yes), the control unit 22 suspends the projection of an image by the projector 34 at Step S82, and sets the call operation inhibition state and displays a call inhibition time at Step S124. The call inhibition time is the time which is estimated to be taken until the terminal temperature drops to be lower than the reference temperature and a call can be performed. After the call operation inhibition state is set and the call inhibition time is displayed at Step S124, the control unit 22 proceeds to perform the process of Step S30.

Returning to FIG. 11, if it is determined at Step S40 that the detected event is not the incoming call event (No), the control unit 22 determines whether the detected event is a call end event at Step S44. A call end event refers to an instruction for ending a call with another terminal. If it is determined at Step S44 that the detected event is the call end event (Yes), the control unit 22 performs a process of the call end mode at Step S46, then proceeds to perform the process of Step S30, and returns to a state standing by for an event. The call end mode is the same process as the process illustrated in FIG. 9, thus description thereof will not be repeated.

If it is determined at Step S44 that the detected event is not the call end event (No), the control unit 22 determines whether the detected event is a release event at Step S106. A release event refers to an instruction for releasing the call operation inhibition state. When it is calculated that the terminal temperature is lower than the reference temperature on the basis of the detection result by the temperature sensor 39, the instruction for releasing is input by the control unit 22 itself. If it is determined at Step S106 that the detected event is the release event (Yes), the control unit 22 clears the call operation inhibition state, that is, sets a state where a call can be performed at Step S108, then proceeds to perform the process of Step S30, and returns to a state standing by for an event.

If it is determined at Step S106 that the detected event is not the release event (No), it is determined whether the detected event is a power-off event at Step S48. A power-off event refers to an instruction which turns off the power supply of the mobile electronic device 10. That is, A power-off event refers to an instruction which stops the driving of the mobile electronic device 10. If it is determined at Step S48 that the detected event is not the power-off event (No), the control unit 22 proceeds to perform the process of Step S30, and returns to a state standing by for an event. If it is determined at Step S48 that the detected event is the power-off event (Yes), the control unit 22 performs an end process, that is, a process for ending each software program and stopping the driving of the mobile electronic device 10 at Step S50, and the process ends.

Figure 14:
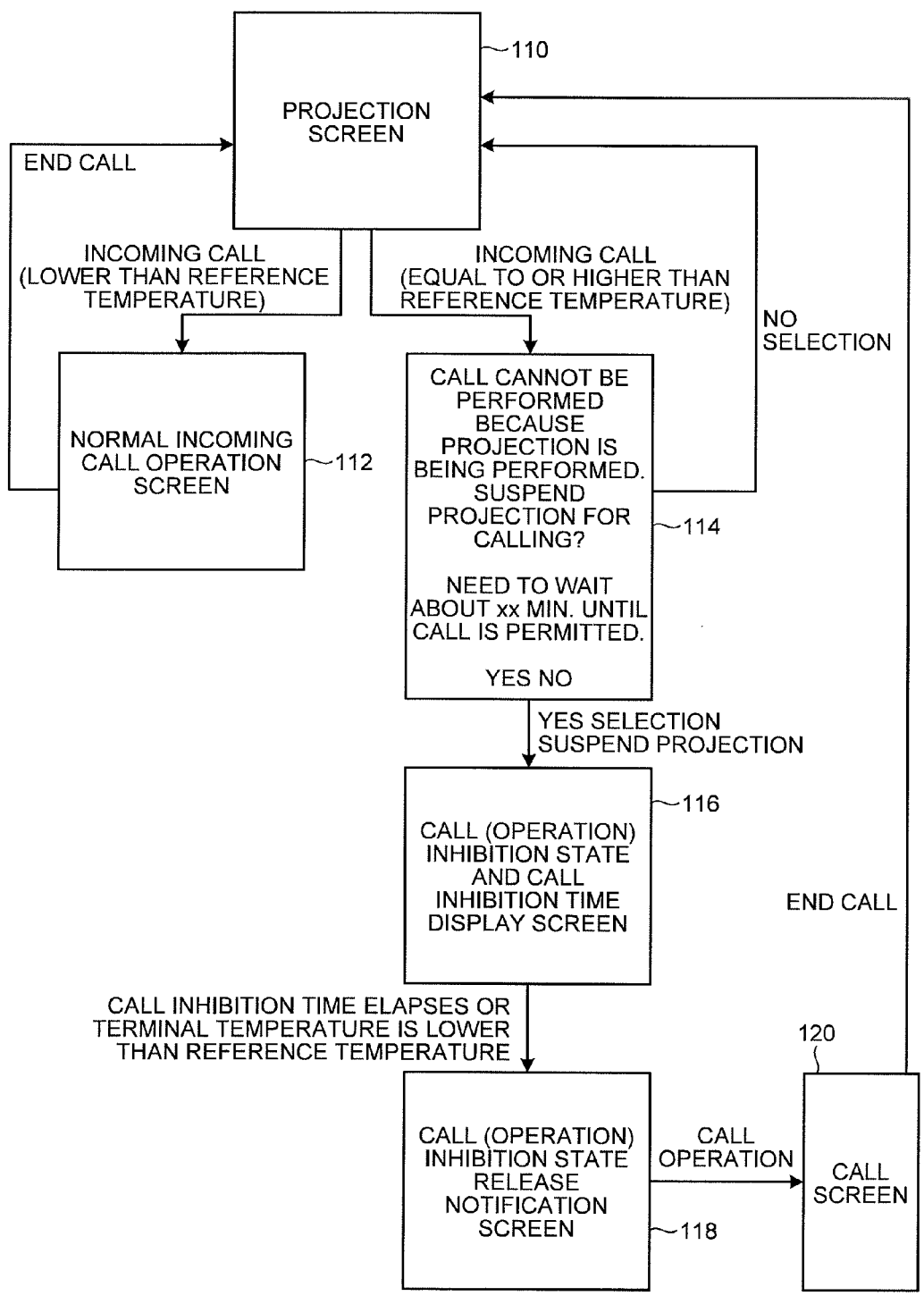
FIG. 14 is an explanatory view illustrating the operation of the mobile electronic device illustrated in FIG. 11.

The process by the control unit 22 is performed in the above-described manner. Next, an example of a change of an image to be displayed on the display unit by the process illustrated in FIGS. 11 to 13 will be described with reference to FIG. 14. FIG. 14 is an explanatory view illustrating the operation of the mobile electronic device illustrated in FIG. 11. For example, while an image is being projected by the projector 34, as illustrated in FIG. 14, an image corresponding to the image being projected or the processing screen thereof is displayed as a projection screen 110. In this case, if there is an incoming call, the process progresses from Step S40 to Step S122, in which, when the terminal temperature is lower than the reference temperature, a normal incoming call operation screen 112 is displayed and a call by a normal call is performed. Thereafter, when the normal call ends, the process of the call end mode is performed, and if the terminal temperature is lower than the reference temperature, projection is resumed and the projection screen 110 is displayed.

When the terminal temperature is equal to or higher than the reference temperature at the time of an incoming call, a notification that the person is unavailable on the phone because projection is being performed is sent (automatically responded) to a terminal, which makes an outgoing call, by an automated voice. Thereafter, as illustrated in FIG. 14, a screen 114 is displayed which includes warning messages of "CALL CANNOT BE PERFORMED BECAUSE PROJECTION IS BEING PERFORMED." and "NEED TO WAIT ABOUT xx MIN. UNTIL CALL IS PERMITTED." and a selection message of "SUSPEND PROJECTION FOR CALLING? YES NO" displayed between "CALL CANNOT BE PERFORMED BECAUSE PROJECTION IS BEING PERFORMED." and "NEED TO WAIT ABOUT xx MIN. UNTIL CALL IS PERMITTED." (Step S78). Thereafter, if (NO) is selected, a call is not started, and the projection screen 110 is returned. Meanwhile, if (YES) is selected, the projection of an image by the projector 34 is suspended. At this time, if the automatic response is continuing, that is, if communication with a call party is being performed, an indication "THERE WILL BE A CALL BACK AFTER XX MINUTES OR SO" is responded by automated voice. If projection is suspended, a screen 116 is displayed which represents the indication of the call (operation) inhibition state and the call inhibition time (Step S124). As described above, the call operation inhibition state can be set in a stepwise manner according to the terminal temperature. Thereafter, if a predetermined time has elapsed or if the terminal temperature is lower than the reference temperature, a call (operation) inhibition state release notification screen 118 including an indication that the call operation inhibition state is released is displayed. Thereafter, a call screen 120 is displayed on which a call operation is performed by the operator. When a call ends, the process of the call end mode is performed, projection is resumed, and the projection screen 110 is displayed.

Figure 15:
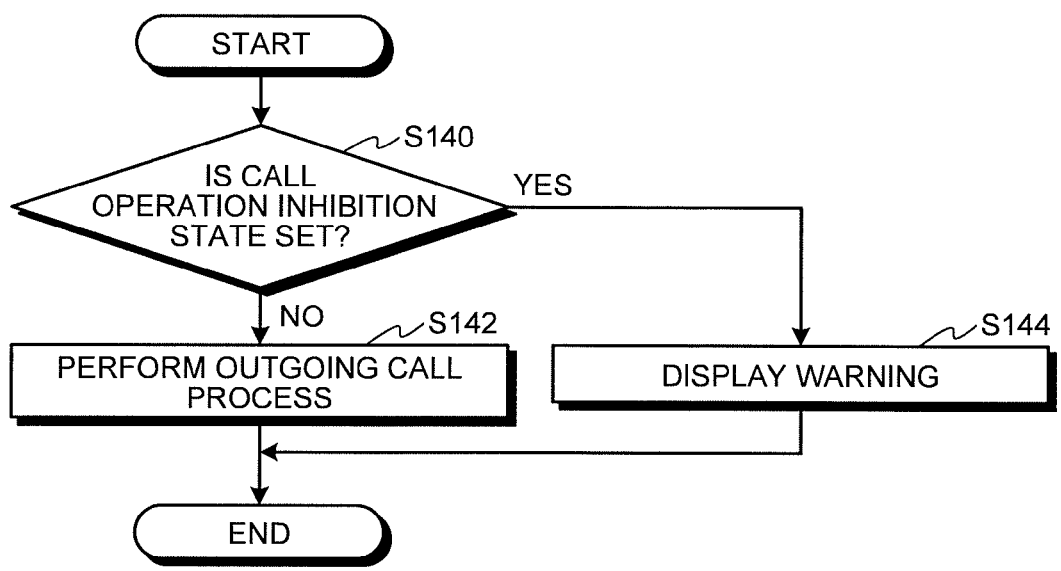
FIG. 15 is a flowchart illustrating another example of the operation of the mobile electronic device.

When the call operation inhibition state is set, it is preferable that an outgoing call operation is inhibited. Hereinafter, description will be provided with reference to FIG. 15. FIG. 15 is a flowchart illustrating another example of the operation of the mobile electronic device. If an outgoing call operation is input, the control unit 22 determines whether the call operation inhibition state is set at Step S140. If it is determined at Step S140 that the call operation inhibition state is not set (No), the control unit 22 performs an outgoing call process at Step S142 to start a call with another terminal, and ends the process. If it is determined at Step S140 that the call operation inhibition state is set (Yes), the control unit 22 displays a warning at Step S144. As the warning, a message indicating that the call operation inhibition state is set or that the terminal temperature is equal to or higher than the reference temperature is displayed. After the warning is displayed at Step S144, the control unit 22 ends the process without performing the outgoing call process. As described above, when the call operation inhibition state is set, the outgoing call operation is inhibited, such that, when the terminal temperature is equal to or higher than the reference temperature, communication may not be performed.

Figure 16:
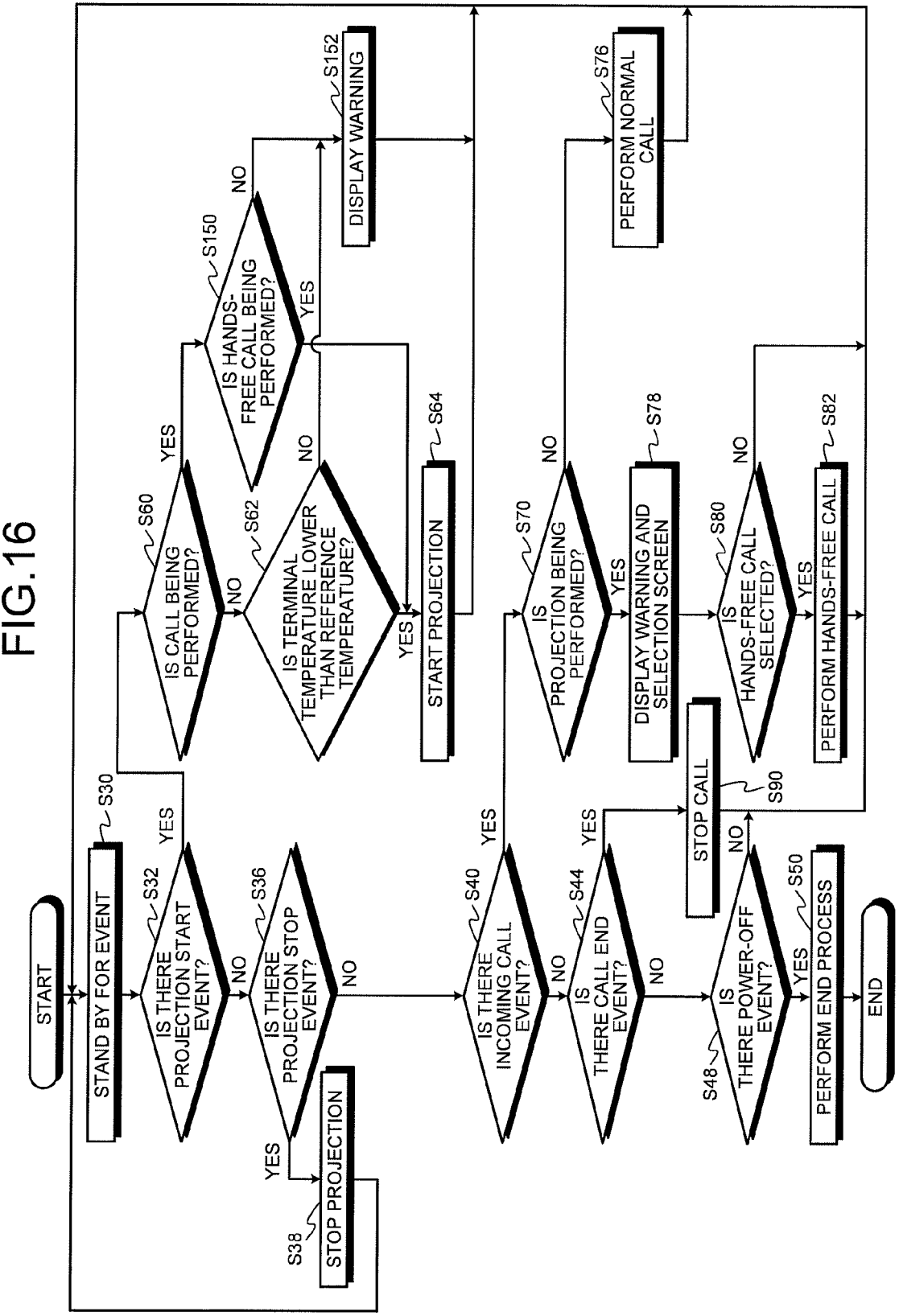
FIG. 16 is a flowchart illustrating another example of the mobile electronic device.
Figure 17:
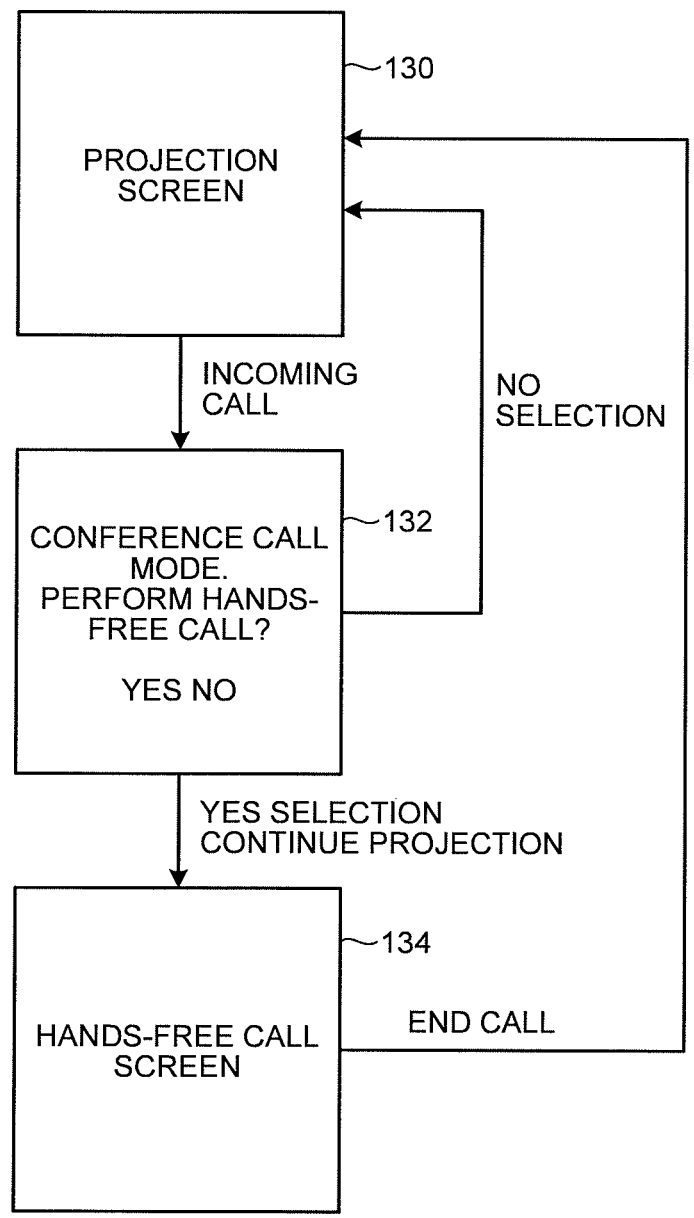
FIG. 17 is an explanatory view illustrating the operation of the mobile electronic device illustrated in FIG. 16.

Hereinafter, another example of the operation of the mobile electronic device 10, specifically, the processing operation of the control unit 22 and the projection operation of the projector 34, in a conference call mode in which an image supplied from a call party is projected by the projector 34 while performing communication with another terminal, will be described with reference to FIGS. 16 and 17. The conference call mode is a mode which is selected such that only a hands-free call can be performed. FIG. 16 is a flowchart illustrating another example of the operation of the mobile electronic device. The control operation illustrated in FIG. 16 is the same as the control operation illustrated in FIGS. 6 to 9 except some parts, thus description of the same process parts will not be repeated. Hereinafter, a process specific to this control will be described.

First, as illustrated in FIG. 16, the control unit 22 stands by for an event at Step S30, and if the event is detected, proceeds to perform the process of Step S32. If an event is detected at Step S30, the control unit 22 determines whether the detected event is a projection start event at Step S32. A projection start event refers to an instruction for starting the projection of an image by the projector 34. If it is determined at Step S32 that the detected event is the projection start event (Yes), the control unit 22 performs a process of a projection start mode, and determines whether a call is being performed at Step S60.

If it is determined at Step S60 that a call is being performed (Yes), the control unit 22 determines whether a hands-free call is being performed at Step S150. If it is determined at Step S150 that a hands-free call is being performed (Yes), the control unit 22 proceeds to perform the process of Step S64. If it is determined at Step S150 that a hands-free call is not performed (No), the control unit 22 proceeds to perform the process of Step S152.

If it is determined at Step S60 that a call is not performed (No), the control unit 22 determines whether the terminal temperature is lower than the reference temperature at Step S62. The reference temperature at Step S62 may be equal to or different from the reference temperature as the reference for the determination on whether the above-described call is performed by a hands-free call or a normal call. The reference temperature at Step S62 can be set to be higher than the reference temperature for setting a call method, and as the reference for setting, the temperature at which the performance of the projector 34 is likely to be degraded is exemplified. If it is determined at Step S62 that the terminal temperature is lower than the reference temperature (Yes) or if it is determined at Step S150 to be (Yes), the control unit 22 starts the projection of an image by the projector 34 at Step S64. At this time, when it is determined at Step S150 to be (Yes), an image supplied during a call is projected, such that a conference call can be performed. The control unit 22 proceeds to perform the process of Step S30 while projecting an image from the projector 34.

If it is determined at Step S150 to be (No) or if it is determined at Step S62 that the terminal temperature is not lower than the reference temperature (No), the control unit 22 displays a warning at Step S152. The warning display is a notification which is output toward the operator, and is displayed on the display unit 32. The warning display may differ between when it is determined at Step S150 to be (No) and when it is determined at Step S62 to be (No). For example, when it is determined at Step S150 to be (No), since a hands-free call is not performed, the warning display indicating that the projector 34 cannot be activated unless a call is stopped or a call method is switched may be performed. When it is determined at Step S62 to be (No), the warning display indicating that the projector 34 cannot be activated because the terminal temperature is equal to or higher than a prescribed temperature may be performed. After the warning is displayed at Step S152, the control unit 22 proceeds to perform the process of Step S30.

If it is determined at Step S32 that the detected event is not the projection start event (No), the control unit 22 determines whether the detected event is the projection stop event at Step S36. If it is determined at Step S36 that the detected event is the projection stop event (Yes), the control unit 22 stops the projection of an image by the projector 34 at Step S38, then proceeds to perform the process of Step S30, and returns to a state standing by for an event.

If it is determined at Step S36 that the detected event is not the projection stop event (No), the control unit 22 determines whether the detected event is the incoming call event at Step S40. If it is determined at Step S40 that the detected event is the incoming call event (Yes), the control unit 22 determines whether projection is being performed at Step S70 (incoming call mode process). That is, it is determined whether an image is being projected by the projector 34. If it is determined at Step S70 that projection is not being performed (No), the control unit 22 starts a call by a normal call at Step S76, and then proceeds to perform the process of Step S30.

If it is determined at Step S70 that projection is being performed (Yes), the control unit 22 displays a warning and selection screen at Step S78. The warning and selection screen is a screen on which both a warning message and a selection message are displayed. The warning message is a message indicating that the conference call mode is set. The selection message is a message relating to the selection of whether or not to perform a call as a hands-free call. The operator inputs an instruction to determine whether or not to perform a call as a hands-free call on the basis of the selection notification.

After the warning and selection screen is displayed at Step S78, the control unit 22 determines whether a hands-free call is selected at Step S80. If it is determined at Step S80 that a hands-free call is not selected (No), for example, the determination not to perform a hands-free call is input, the control unit 22 ends the process of the incoming call mode as it is, and proceeds to perform the process of Step S30. In this case, the projection of an image by the projector 34 is continued.

If it is determined at Step S80 that a hands-free call is selected (Yes), the control unit 22 starts a call as a hands-free call at Step S82. Thereafter, the control unit 22 proceeds to perform the process of Step S30.

If it is determined at Step S40 that the detected event is not the incoming call event (No), the control unit 22 determines whether the detected event is the call end event at Step S44. If it is determined at Step S44 that the detected event is the call end event (Yes), the control unit 22 stops a call at Step S90. After the call is stopped at Step S90, the control unit 22 ends the process of the call end mode, and proceeds to perform the process of Step S30.

If it is determined at Step S44 that the detected event is not the call end event (No), the control unit 22 determines whether the detected event is the power-off event at Step S48. If it is determined at Step S48 that the detected event is not the power-off event (No), the control unit 22 proceeds to perform the process of Step S30, and returns to a state standing by for an event. If it is determined at Step S48 that the detected event is the power-off event (Yes), the control unit 22 performs an end process, that is, a process for ending each software program and stopping the driving of the mobile electronic device 10 at Step S50, and the process ends.

The process by the control unit 22 is performed in the above-described manner. Next, an example of a change of an image to be displayed on the display unit by the process illustrated in FIG. 16 will be described with reference to FIG. 17. FIG. 17 is an explanatory view illustrating the operation of the mobile electronic device illustrated in FIG. 16. For example, while an image is being projected by the projector 34, as illustrated in FIG. 17, an image corresponding to the image being projected or the processing screen thereof is displayed as a projection screen 130. In this state, if there is an incoming call, as illustrated in FIG. 17, a warning and selection screen 132 including a warning message "CONFERENCE CALL MODE." and a selection "PERFORM HANDS-FREE CALL? YES NO" is displayed (Step S78). Thereafter, if (NO) is selected, a call is not started, and the projection screen 130 is returned. Meanwhile, if (YES) is selected, a hands-free call starts in a state where the projection of an image by the projection is continued, and a hands-free call screen 134 is displayed. Thereafter, when a call ends, the process of the call end mode is performed, and if the terminal temperature is lower than the reference temperature, the projection is resumed and the projection screen 130 is displayed.

As described, the conference call mode is selectable, making it possible for the user to perform a call without feeling that the device is hot.

It is preferable that the mobile electronic device switches ring tones depending on the difference between the terminal temperature and the reference temperature. FIG. 18 is a flowchart illustrating another example of the operation of the mobile electronic device. Hereinafter, description will be provided with reference to FIG. 18. In the process illustrated in FIG. 18, a process is performed for switching a ring tone only when an image is being projected by the projector 34. The control unit 22 and/or the storage unit 24 store therein a table or information (data) in which the relationship between the terminal temperature and the ring tone is stored. For example, four ring tones are associated with four stages including when the terminal temperature is lower than the reference temperature, when the terminal temperature is equal to or higher than the reference temperature and lower than the reference temperature+5 degrees, when the terminal temperature is equal to or higher than the reference temperature+5 degrees and lower than the reference temperature+10 degrees, and when the terminal temperature is equal to or higher than the reference temperature+10 degrees.

First, if there is an incoming call, the control unit 22 determines whether an image is being projected by the projector 34 at Step S200. If it is determined at Step S200 that projection is not performed (No), the control unit 22 proceeds to perform the process of Step S206.

If it is determined at Step S200 that projection is being performed (Yes), the control unit 22 acquires the terminal temperature at Step S202, and determines whether the terminal temperature is lower than the reference temperature at Step S204. If it is determined at Step S204 that the terminal temperature is lower than reference temperature (Yes), the control unit 22 proceeds to perform the process of Step S206. If it is determined at Step S200 to be (No) or if it is determined at Step S204 to be (Yes), the control unit 22 performs the normal ring tone control at Step S206. That is, a ring tone which is set to correspond to a normal ring tone (when the terminal temperature is lower than the reference temperature) is sounded, and the process ends.

If it is determined at Step S204 that the terminal temperature is not lower than the reference temperature (No), that is, equal to or higher than the reference temperature, the control unit 22 reads a ring tone table in which the relationship between the terminal temperature and the ring tones is stored to acquire information on the ring tone corresponding to the detected terminal temperature, at Step S210. Thereafter, the control unit 22 sounds the acquired ring tone at Step S212, and displays a warning at Step S214. The warning is a message which notifies that the terminal temperature is equal to or higher than the reference temperature. The control unit 22 ends the process after displaying the warning at Step S214.

As described above, even when a call method is not forcibly switched, notifying that the terminal temperature is higher than the reference temperature by sound allows the operator to recognize the state of the mobile electronic device 10 without touching the mobile electronic device 10. The operator selects a call method or selects whether or not to perform a call on the basis of this information, so that it is possible to prevent the operator from performing a call while feeling that the device is hot or heated, and thus the mobile electronic device 10 can perform an appropriate communication operation when communicating with another terminal. Switching ring tones allows the operator to easily recognize the temperature of the mobile electronic device 10 by the ring tone.

The notification by a ring tone in the above-described manner and the control of a call method as illustrated in FIGS. 4 to 15 may be combined, so that it is possible to more reliably prevent the operator from performing a call while feeling that the device is hot or heated, and thus the mobile electronic device 10 can perform an appropriate communication operation when communicating with another terminal.

In the embodiment, a ring tone is changed. However, the invention is not limited thereto, and the current terminal temperature may be notified by sound. In this case, it is preferable to make a notification only when the terminal temperature exceeds the reference temperature. Thus, it is possible to prevent the voice from being sounded unnecessarily. In the foregoing embodiment, the process is performed only when there is a high possibility that the terminal temperature is equal to or higher than the reference temperature, and the control is performed in which a ring tone is determined only at the time of the projection of an image by the projector 34. However, the invention is not limited thereto, and when there is an incoming call, determination may be constantly performed. When determination is constantly performed, it is possible to detect the time at which the terminal temperature is equal to or higher than the reference temperature without exception. When there is an operation by the user, the above-described control may be performed.

The invention is not limited to the foregoing embodiments. For example, the embodiments may be combined with each other. The controls of a plurality of embodiments may be performed simultaneously, may be performed in combination, or may be switched between each other depending on the usage.

In the embodiment, a case has been described where the heat generation source (heat source unit) is the projector 34. However, the heat source unit is not particularly limited. For example, when the terminal temperature of the housing increases due to the electric power generated by the fuel cell or when the terminal temperature of the housing increases by the battery, the control can be performed similarly, thereby obtaining the similar effects. With regard to the heat source unit, a heat source unit which is driven to generate heat is preferably used.

In the embodiment, a message is displayed on the display unit and a sound output method is changed in accordance with a communication mode, because it is possible to more accurately recognize whether or not the terminal temperature is lower than the reference temperature, and to prevent the operator from operating the mobile electronic device while feeling that the device is warm (, hot, or heated). However, the invention is not limited thereto. For example, the sound output method may be switched without displaying a message on the display unit. The sound output method may be automatically changed and/or determined, instead of allowing the operator to select it. Even when the sound output method is automatically changed, the operator can recognize the situation of the terminal temperature. The sound output method is changed, so it is not necessary for the operator to perform a call while bending his/her ear to the housing, thereby preventing the operator from performing a call while feeling that the device is hot or heated.

In the embodiment, when the terminal temperature is equal to or higher than the reference temperature, sound output by the receiver is stopped, and sound is output from the speaker accordingly. However, the invention is not limited thereto. For example, the sound output unit may include only a single speaker (or receiver), and when the terminal temperature is lower than the reference temperature, the volume level is set so that sound (that is, sound output from the sound output unit) from the terminal can be heard at the operator's ear. When the terminal temperature is equal to or higher than the reference temperature, the volume level is set so that sound (that is, sound output from the sound output unit) from the terminal can be sufficiently heard even in a state where the terminal is placed on a desk. That is, the reference of the volume level sound to be output may be switched.

Industrial Applicability

As described above, the mobile electronic device according to the present invention is suitably used as a mobile electronic device which projects an image from a projector or a mobile electronic device having a battery liable to generate heat etc., and is particularly suitably used for a mobile phone.

The invention claimed is:
1. A mobile electronic device, comprising:
a heat source unit configured to generate heat;
a housing configured to hold the heat source unit;
a temperature detection unit configured to detect the temperature of the housing;
a communication unit configured to perform a communication with outside;
a sound output unit configured to output a sound relating to the communication;
a control unit configured to control the heat source unit and the communication unit; and
a storage unit configured to store a correspondence relationship between the temperature detected by the tem- perature detection unit and a sound output pattern outputted from the sound output unit, wherein
the control unit is configured to
change the sound outputted from the sound output unit depending on the temperature detected by the temperature detection unit and a set temperature, and
output the sound output pattern specified based on the temperature detected by the temperature detection unit and the correspondence relationship when an incoming call is detected by the communication unit.

2. The mobile electronic device according to claim 1, wherein the control unit has a plurality of output modes in which settings for outputting sound relating to the communication differ, and is configured to perform a control while switching the output modes between when the temperature detected by the temperature detection unit is equal to or higher than the set temperature and when the temperature by the temperature detection unit is lower than the set temperature.

3. The mobile electronic device according to claim 1, wherein the control unit is configured to increase a volume level of the sound outputted from the sound output unit when the temperature detected by the temperature detection unit is equal to or higher than the set temperature compared to when the temperature detected by the temperature detection unit is lower than the set temperature.

4. The mobile electronic device according to claim 1, wherein
the sound output unit includes
a receiver configured to output the sound, and
a speaker configured to output the sound louder than that from the receiver, and
the control unit is configured to output the sound using the speaker when the temperature detected by the temperature detection unit is equal to or higher than the set temperature.

5. The mobile electronic device according to claim 1, wherein the control unit is configured to perform an inhibition control for inhibiting a call from being performed by the communication unit when the temperature detected by the temperature detection unit is equal to or higher than the set temperature.

6. The mobile electronic device according to claim 5, wherein the inhibition control includes at least one of inhibiting an outgoing call, stopping a call, or rejecting an incoming call by the communication unit.

7. The mobile electronic device according claim 1, wherein, when the temperature detected by the temperature detection unit is equal to or higher than the set temperature, the control unit is configured to
estimate a time which will be taken until the temperature detected by the temperature detection unit decreases to be lower than the set temperature, and
notify the estimated time to the outside.

8. The mobile electronic device according to claim 1, wherein the heat source unit is an image projection unit for projecting an image.

9. The mobile electronic device according claim 1,
wherein the temperature detection unit includes
a detection element for detecting the temperature at a measurement point of the housing, and
a temperature correspondence table for storing a relationship between the temperature at the measurement point of the housing and the temperature in the outer surface of the housing, and
wherein the temperature detection unit is configured to detect the temperature in the outer surface of the housing based on the temperature detected by the detection element and the temperature correspondence table.

10. The mobile electronic device according to claim 9, wherein the measurement point of the temperature detection unit is near the sound output unit in the outer surface of the housing.

11. A mobile electronic device, comprising:
a heat source unit that generates heat;
a housing for holding the heat source unit;
a temperature detection unit for detecting the temperature of the housing;
a communication unit for performing communications;
a receiver for outputting sound relating to the communication;
a speaker for outputting a louder sound than the receiver;
a storage unit for storing a correspondence relationship between the temperature detected by the temperature detection unit and a sound output pattern; and
a control unit for controlling the operation of the heat source unit and the operation of the communication unit,
wherein the control unit reads the correspondence relationship from the storage unit, specifies the sound output pattern on the basis of the temperature detected by the temperature detection unit and the correspondence relationship, and outputs the specified sound output pattern from the speaker, when an incoming call from another terminal is detected.

12. A mobile electronic device, comprising:
a heat source unit configured to generate heat;
a housing configured to hold the heat source unit;
a temperature detection unit configured to detect the temperature of the housing;
a communication unit configured to perform a communication with outside;
a sound output unit configured to output a sound relating to the communication; and
a control unit configured to control the heat source unit and the communication unit, wherein
the control unit is configured to change the sound outputted from the sound output unit depending on the temperature detected by the temperature detection unit and a set temperature, and
when the temperature detected by the temperature detection unit is equal to or higher than the set temperature, the control unit is configured to
estimate a time which will be taken until the temperature detected by the temperature detection unit decreases to be lower than the set temperature, and
notify the estimated time to the outside.

13. The mobile electronic device according to claim 12, wherein the control unit has a plurality of output modes in which settings for outputting sound relating to the communication differ, and is configured to perform a control while switching the output modes between when the temperature detected by the temperature detection unit is equal to or higher than the set temperature and when the temperature by the temperature detection unit is lower than the set temperature.

14. The mobile electronic device according to claim 12, wherein the control unit is configured to increase a volume level of the sound outputted from the sound output unit when the temperature detected by the temperature detection unit is equal to or higher than the set temperature compared to when the temperature detected by the temperature detection unit is lower than the set temperature.

15. The mobile electronic device according to claim 12, wherein the sound output unit includes
- a receiver configured to output the sound, and
- a speaker configured to output the sound louder than that from the receiver, and the control unit is configured to output the sound using the speaker when the temperature detected by the temperature detection unit is equal to or higher than the set temperature.

16. The mobile electronic device according to claim 12, wherein the control unit is configured to perform an inhibition control for inhibiting a call from being performed by the communication unit when the temperature detected by the temperature detection unit is equal to or higher than the set temperature.

17. The mobile electronic device according to claim 16, wherein the inhibition control includes at least one of inhibiting an outgoing call, stopping a call, or rejecting an incoming call by the communication unit.

* * * * *